United States Patent
Lew et al.

(10) Patent No.: US 11,200,207 B1
(45) Date of Patent: Dec. 14, 2021

(54) COMPLIANCE NAMESPACE SEPARATION TO ACHIEVE SNAPSHOT BASED CONSISTENCY ACROSS FAILOVER-FAILBACK WHILE MAINTAINING DATA RETENTION REGULATION COMPLIANCE

(71) Applicant: EMC IP Holding Company LLC, Hopkinton, MA (US)

(72) Inventors: Darrick Peter Lew, Seattle, WA (US); Shantanu Sardesai, Sammamish, WA (US); Dmitri Chmelev, Seattle, WA (US); Tyler Oshiro, Bothell, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 764 days.

(21) Appl. No.: 15/279,887

(22) Filed: Sep. 29, 2016

(51) Int. Cl.
  *G06F 16/10* (2019.01)
  *G06F 16/178* (2019.01)
  *G06F 11/14* (2006.01)
  *G06F 16/182* (2019.01)

(52) U.S. Cl.
  CPC ........ *G06F 16/178* (2019.01); *G06F 11/1451* (2013.01); *G06F 11/1464* (2013.01); *G06F 11/1469* (2013.01); *G06F 16/182* (2019.01); *G06F 2201/80* (2013.01); *G06F 2201/805* (2013.01); *G06F 2201/82* (2013.01); *G06F 2201/84* (2013.01)

(58) Field of Classification Search
  None
  See application file for complete search history.

(56) References Cited

U.S. PATENT DOCUMENTS

| | | | | |
|---|---|---|---|---|
| 8,620,861 | B1 * | 12/2013 | Uhrhane | G06F 16/1873 707/610 |
| 2004/0260674 | A1 * | 12/2004 | Primm | G06F 11/3058 |
| 2008/0154777 | A1 * | 6/2008 | Achiwa | G06F 11/1096 705/51 |
| 2010/0070515 | A1 * | 3/2010 | Dutton | G06F 16/13 707/755 |
| 2011/0145517 | A1 * | 6/2011 | Bish | G06F 12/121 711/154 |
| 2013/0144834 | A1 * | 6/2013 | Lloyd | G06F 16/951 707/617 |
| 2015/0066852 | A1 * | 3/2015 | Beard | G06F 16/178 707/625 |
| 2016/0092540 | A1 * | 3/2016 | Bihani | G06F 16/256 707/624 |

* cited by examiner

*Primary Examiner* — Jau Shya Meng
(74) *Attorney, Agent, or Firm* — Krishnendu Gupta; Nikhil Patel

(57) ABSTRACT

Embodiments of the present disclosure relate to creating and maintaining a separate compliance store within a domain. Files that are committed within the domain are linked to the compliance store using canonical links. Canonical links are guaranteed to be non-erasable and non-rewritable for the duration of their retention period. When using a source cluster of nodes as a primary production cluster and a target cluster of nodes as a backup cluster, file data and canonical links can be synced from the source cluster to the target cluster to maintain compliance with data retention rules. Non-canonical links can be modified as necessary to ensure snapshot consistency when failover or failback occurs between a source cluster of nodes and a target cluster of nodes.

20 Claims, 41 Drawing Sheets

STATE A

STATE B

| REPSTATES | LIN MAPS | | REPSTATES | LIN MAPS |
|---|---|---|---|---|
| | | | | |
| CMP SBT | DPL | | CMP SBT | DPL |
| | | | | |

Source (S4)

Target (S5 = S4')

| REPSTATES | LIN MAPS |
|---|---|
| Base: 1, 2, 3, 4, 5, 6, 7 Sel: 1 | |
| CMP SBT | DPL |
| | |

| REPSTATES | LIN MAPS |
|---|---|
| | Base: 1>51, 2>52, 3>54, 4>58, 5>56, 6>57, 7>59 |
| CMP SBT | DPL |
| Resync: 53, 55 | |

Source (S4)

Target (S6 = S4')

| REPSTATES | LIN MAPS |
|---|---|
| Base: 1, 2, 3, 4, 5, 6, 7<br>Sel: 1 | |
| CMP SBT | DPL |
| | |

| REPSTATES | LIN MAPS |
|---|---|
| | Base: 1>51, 2>52, 3>54,<br>4>58, 5>56, 6>57, 7>59 |
| CMP SBT | DPL |
| Resync: 53, 55 | |

Source (S4)

Target (S8 = S4')

| REPSTATES | LIN MAPS |
|---|---|
| Base: 1, 2, 3, 4, 5, 6, 7<br>Sel: 1 | |
| CMP SBT | DPL |
| | |

| REPSTATES | LIN MAPS |
|---|---|
| | Base: 1>51, 2>52, 3>54,<br>4>58, 5>56, 6>57, 7>59 |
| CMP SBT | DPL |
| Resync: 53, 55, 59<br>Conf: 59<br>Cmap: 59>60 | |

Source (S4)

Target (S9)

| REPSTATES | LIN MAPS |
|---|---|
| Base: 1, 2, 3, 4, 5, 6, 7<br>Sel: 1 | |
| CMP SBT | DPL |
| | |

| REPSTATES | LIN MAPS |
|---|---|
| | Base: 1>51, 2>52, 3>54,<br>4>58, 5>56, 6>57, 7>59 |
| CMP SBT | DPL |
| Resync: 53, 55, 59<br>Cmap: 59>60 | |

Source (S4)

Target (S10 = S4')

| REPSTATES | LIN MAPS |
|---|---|
| Base: 1, 2, 3, 4, 5, 6, 7<br>Sel: 1 | |
| CMP SBT | DPL |
| | |

| REPSTATES | LIN MAPS |
|---|---|
| | Base: 1>51, 2>52, 3>54,<br>4>58, 5>56, 6>57, 7>59 |
| CMP SBT | DPL |
| Resync: 53, 55, 59<br>Cmap: 59>60 | |

Source (S12 = S4)    Target (S10 = S4')

| REPSTATES | LIN MAPS |
|---|---|
| Base: 1, 2, 3, 4, 5, 6, 7, 8<br>Sel: 1 | Mirror: 51>1, 52>2, 54>3,<br>56>5, 57>6, 58>4, 59>7 |
| CMP SBT | DPL |
| Resync: 7<br>Conf: 7<br>Cmap: 7>8 | Pend: 7 |

| REPSTATES | LIN MAPS |
|---|---|
| Mbase: 51, 52, 54, 56, 57, 58, 59 | Base: 1>51, 2>52, 3>54,<br>4>58, 5>56, 6>57, 7>59 |
| CMP SBT | DPL |
| Resync: 53, 55, 59<br>Cmap: 59>60 | |

Source (S12 = S4)

Target (S10 = S4')

| REPSTATES | LIN MAPS |
|---|---|
| Base: 1, 2, 3, 4, 5, 6, 7, 8<br>Sel: 1 | Mirror: 51>1, 52>2, 54>3, 56>5, 57>6, 58>4, 59>7, 60>8 |
| CMP SBT | DPL |
| Resync: 7<br>Cmap: 7>8 | |

| REPSTATES | LIN MAPS |
|---|---|
| Mbase: 51, 52, 54, 56, 57, 58, 59, 60 | Base: 1>51, 2>52, 3>54, 4>58, 5>56, 6>57, 7>59, 8>60 |
| CMP SBT | DPL |
| Resync: 53, 55, 59<br>Cmap: 59>60 | |

Source (S12 = S4)

Target (S13)

| REPSTATES | LIN MAPS |
|---|---|
| MBase: 1, 2, 3, 4, 5, 6, 8<br>Sel: 1 | Mirror: 51>1, 52>2, 54>3,<br>56>5, 57>6, 58>4, 60>8 |
| CMP SBT | DPL |
| Resync: 7<br>Cmt: 8 | |

| REPSTATES | LIN MAPS |
|---|---|
| MBase: 51, 52, 54, 56, 57, 58,<br>60<br>Minc: 53, 55, 60 | Mirror: 1>51, 2>52, 3>54,<br>4>58, 5>56, 6>57, 8>60, |
| CMP SBT | DPL |
| Resync: 53, 55, 59 | Pend: 60 |

Source (S16 = S14')

Target (S17)

Source (S19)

Target (S19')

Source (S19)

Target (S21 = S19')

| REPSTATES | LIN MAPS |
|---|---|
| Base: 1, 2, 3, 4, 5, 6, 8, 9, 10, 11, 12<br>Sel: 1 | Mirror: 51>1, 52>2, 54>3, 56>5, 57>6, 58>4, 60>8, 53>9, 55>10, 59>11, 61>12, 62>7 |
| CMP SBT | DPL |
|  |  |

| REPSTATES | LIN MAPS |
|---|---|
| Base: 51, 52, 54, 56, 57, 58, 60, 53, 55, 59, 61, 62 | Mirror: 1>51, 2>52, 3>54, 4>58, 5>56, 6>57, 8>60, 9>53, 10>55, 11>59, 12>61, 7>62 |
| CMP SBT | DPL |
|  | Pend: 60 |

| REPSTATES | LIN MAPS |
|---|---|
| Base: 1, 2, 3, 4, 5, 6, 8, 9, 10, 11, 12<br>Sel: 1 | Mirror: 51>1, 52>2, 54>3, 56>5, 57>6, 58>4, 60>8, 53>9, 55>10, 59>11, 61>12, 62>7 |
| CMP SBT | DPL |
|  |  |

| REPSTATES | LIN MAPS |
|---|---|
| Base: 51, 52, 54, 56, 57, 58, 60, 53, 55, 59, 61, 62 | Mirror: 1>51, 2>52, 3>54, 4>58, 5>56, 6>57, 8>60, 9>53, 10>55, 11>59, 12>61, 7>62 |
| CMP SBT | DPL |
|  |  |

COMPLIANCE NAMESPACE SEPARATION TO ACHIEVE SNAPSHOT BASED CONSISTENCY ACROSS FAILOVER-FAILBACK WHILE MAINTAINING DATA RETENTION REGULATION COMPLIANCE

FIELD OF THE INVENTION

This invention relates generally to maintaining stored data, and more particularly to systems and methods for maintaining the state of a compliance store when failing over data storage service from a source cluster to target cluster and eventually failing back to the source cluster from the target cluster.

BACKGROUND OF THE INVENTION

Distributed file system offer many compelling advantages in establishing high performance storage environments. One example is the ability for the distributed file system to offer storage to clients using multiple different protocols. In some situations, businesses or organizations may be forced by government regulation or some other externality to preserve records of all transactions made within the distributed file system. For example, the Securities and Exchange Commission mandates through rule 17a-4(f) that records maintained pursuant to some of its regulations must be maintained and preserved for a required time period. When a file is written to disk, regulations can require that the file be made non-modifiable and non-erasable for a fixed period of time. One means of complying with a retention requirement is to commit a file to a "write once read many" ("WORM") state.

Some distributed file systems can also regularly sync with a backup cluster of nodes. The backup cluster of nodes can operate as an independent file system to the primary cluster of nodes. Data can be mirrored on the backup cluster of nodes and incrementally updated to include changes made on the primary cluster of nodes. In some file systems, the backup cluster of nodes can also serve as a failover cluster. The failover cluster can be used when the primary cluster of nodes suffers a cluster failure, or conceivably any adverse performance conditions, making it desirable to migrate clients from the primary cluster of nodes to the backup cluster of nodes, for immediate use by a set of existing clients.

When a distributed file system experiences a real or simulated disaster which necessitates a failover to a backup cluster of nodes, an administrator can failover client traffic to the designated backup, and at some point after failover, if the original cluster of nodes returns to normal operation, the administrator can failback client traffic back to the original cluster of nodes.

The process of mirroring or syncing data from a primary cluster of nodes to a backup cluster of nodes currently involves an incremental process where files are individually synced from a source cluster to a target cluster. Currently, the incremental sync process applies WORM state commits to each file after the sync has finished sending all data and attributes of that file from the source cluster to the target cluster. Thus, if the sync job fails or is cancelled before it completes, files committed to WORM state on the source cluster that are fully sent will be in a committed WORM state on the target cluster; however, files committed to WORM state on the source cluster that had not yet been completely sent to the target will not be committed on the target cluster and may be in an inconsistent state. Therefore, there exists a need for an SEC compliant data retention solution that functions during failover and failback scenarios without compromising data that has required retention properties.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a source cluster of nodes can maintain a source domain that contains a source compliance store. A target cluster of nodes can maintain a target domain that contains a target compliance store. A new sync can be established between the source cluster of nodes to the target cluster of nodes wherein the target cluster operates as a failover target, and wherein the syncing comprises at least: a target resident source compliance store being generated within the target compliance domain.

In accordance with another aspect, a first directory and a first file can be generated in the source domain. In response to generating the first directory in the source domain, the first directory can be generated in the source compliance store. A request to commit the first file can be received. A canonical link to the first file can be generated under the source compliance store. A set of hard links to the first file can be determined. Canonical links can be generated for hard links in the set of hard links.

In accordance with another aspect, a set of files and directories to incrementally sync can be determined based on comparing a source cluster snapshot and a target cluster snapshot. Files and directories can be incrementally copied from the source cluster of nodes to the target cluster of nodes. In response to copying a file among the set of files and directories that is marked as committed, an entry can be added to a target cluster list structure wherein the entry contains at least a LIN of the file and a retention date. In response to the incremental copying completing, files can be committed on the target cluster based on the target cluster list structure. In response to the committing completing, an ending snapshot of the target cluster of nodes can be taken wherein the ending snapshot indicates a successful sync.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
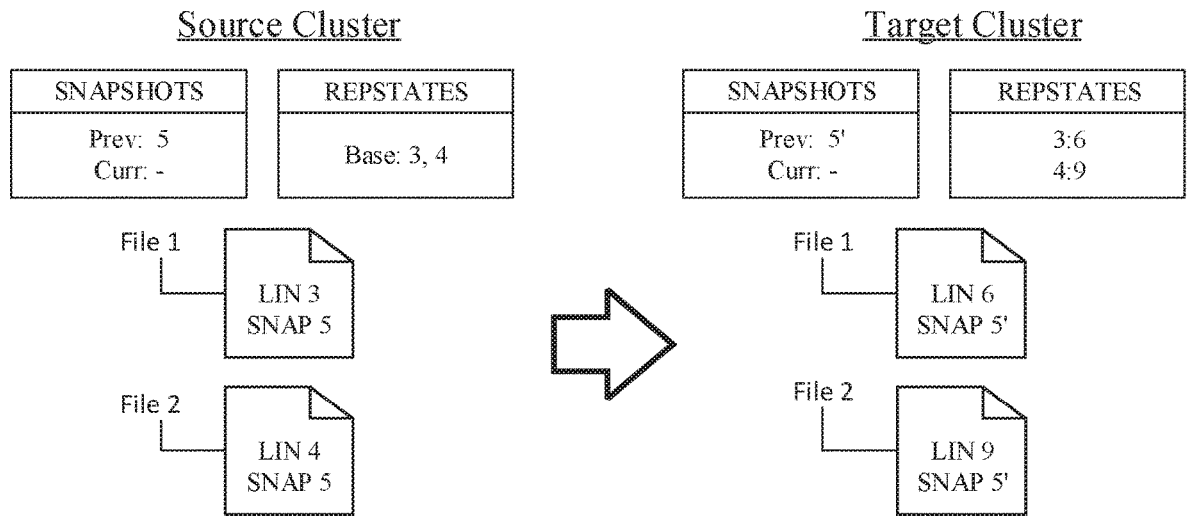
FIG. 1 illustrates a source cluster and a target cluster after initial sync and a source cluster and a target cluster after a partial or interrupted incremental sync in accordance with implementations of this disclosure.
Figure 1:
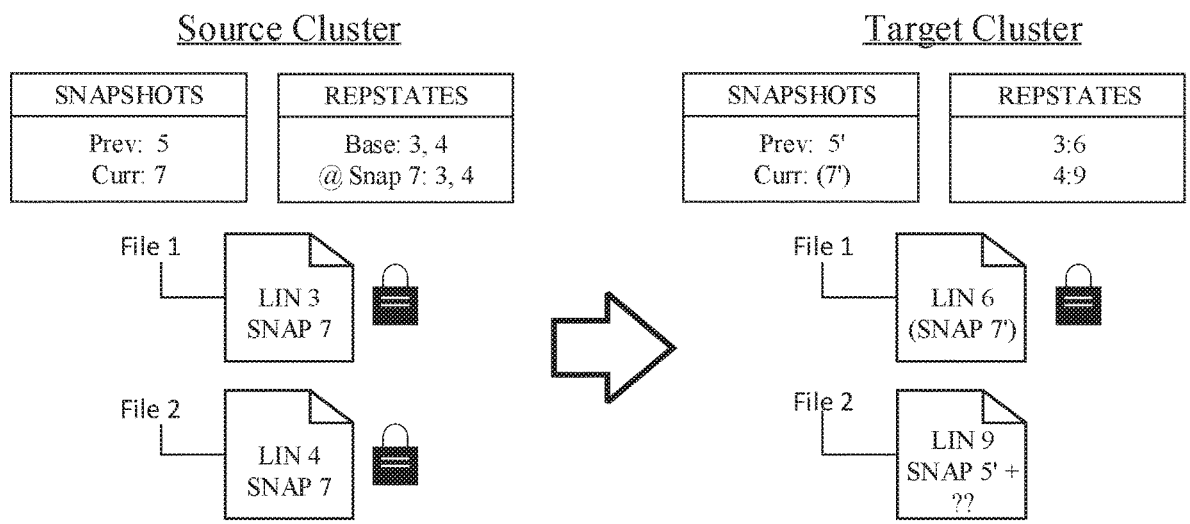

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "inode" or "logical inode" ("LIN") as used herein refers to an in-memory representation of on-disk data structures that may store information, or metadata, about files and directories, such as file size, file ownership, access mode (read, write, execute permissions), time and date of creation and modification, file types, data protection process information, etc. In one implementation, LIN's may be in a known location in a file system, for example, residing in cache memory for fast and/or efficient access by the file system. Before or in conjunction with performing a file system operation on a file or directory, the system call may access the contents of the LIN and/or the contents of the file in determining how to process the system call. In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

The term "allow-write" refers to a sync job that restores a target dataset to its last known good snapshot and makes the dataset writable in preparation for a failover of user operations to that dataset.

The term "canonical ink" refers to a link to a LIN in a WORM compliance domain which is guaranteed to be non-erasable and non-rewritable in compliance with relevant regulations. For example, non-canonical links can be modified during the sync process to preserve snapshot consistency while canonical links cannot be modified.

The term "commit" or "Commit to WORM" refers to rendering a file non-modifiable and non-erasable for a fixed (or infinite) period of time. Files in this state have been committed.

The term "compliance mode" is a state of a distributed file system designed to conform to regulations requiring the retention of data.

The term "compliance store" is a directory within a WORM compliance domain which contains canonical links to WORM committed LINs.

The term "domain" refers to a structure for assigning specific semantics to a directory tree and its constituent files. For example, domains can enforce WORM semantics on specified directory trees.

The term "failback" refers to the process by which data written to a duplicate/backup dataset by users after a successful failover is transitioned back to the original dataset. Users can be transitioned back to performing file operations on the original dataset, and data replication from original to duplicate dataset is restored. Users can execute a resync prep job, perform mirrored syncs using a mirror policy, execute an allow-write job against that mirror policy, and finally execute another resync prep job as a part of an automated failback process.

The term "failover" refers to the process of transitioning users to perform file operations on a duplicate or backup dataset when the original source dataset becomes unavailable. Users can execute an allow-write job as part of a fully automated failover process.

The term "LKG" refers to last known good. The LKG of a dataset is the state of a source or a target dataset in the last known good state of that dataset. For example, during an incremental sync that is interrupted, the LKG of the dataset may be the previously valid snapshot of the dataset prior to beginning the now failed incremental sync.

The term "resync prep" refers to a job type that has a purpose of reversing the direction of a sync. It can first create a restricted write domain on the source dataset, revert the source dataset to a LKG snapshot, then create a mirror policy to sync files from the target dataset to a source dataset if one doesn't exist already.

The term "WORM" refers to write once read many. WORM is a feature in which a file within a particular domain can be rendered non-modifiable and non-erasable for fixed period of time (e.g., a retention period).

The term "WORM compliance domain" can refer to a WORM dataset with strict data retention requirements stipulated by regulations.

Implementations are provided herein for creating and maintaining a separate compliance store within a domain. Files that are committed within the domain are linked to the compliance store using canonical links. Canonical links are guaranteed to be non-erasable and non-rewritable for the duration of their retention period. When using a source cluster of nodes as a primary production cluster and a target cluster of nodes as a backup cluster, file data and canonical links can be synced from the source cluster to the target cluster to maintain compliance with data retention rules. Non-canonical links can be modified as necessary to ensure snapshot consistency when failover or failback occurs between a source cluster of nodes and a target cluster of nodes.

In one implementation, canonical links for a LIN can be created in the compliance store when the File or LIN is committed. The compliance store can reside within a separate directory within the WORM compliance domain. The root directory of the compliance store can be created when the WORM compliance domain is created as shown more fully in regards to FIG. 4.

In one implementation, a compliance daemon can be used to process file commits. After receiving a request to commit a file, the daemon can create a canonical link under the compliance store for the file. The file is then committed. A set of hardlinks to the file can also be determined, and they can be added to the daemon to be processed asynchronously at a later point in time. In processing the set of hardlinks, canonical links can be generated under the compliance store for each hardlink in the set of hardlinks. Using a daemon is just one example for how remaining hardlinks are processed after the first canonical link to the file is established in the compliance store.

Sync components on the source cluster and the target cluster can work together, prior to failover/failback, to replicate files and/or directories between the source cluster and the target cluster. For example, the first time that the source cluster is synced, a tree walk can be made over the entire root directory (e.g., path of the NFS export) or portions of the root directory as selected by an administrator to copy the files and/or directories to the target cluster. After an initial sync, a snapshot service of the base file system (e.g., OneFS) can be used to mirror changes after the first tree walk sync as they occur. It can be appreciated that by using snapshots to mirror files and/or directories in the target cluster, network traffic can be minimized as files and/or directories unchanged since the previous snapshot do not need to be recopied. For example, using a copy on write snapshot system, as data is written to the source cluster, that new data can be synced to the target cluster incrementally upon each write, a batch of writes, or upon custom sync or snapshot settings.

As a part of the sync process, a LIN map can be generated on both the source cluster and the target cluster. The LIN maps can include, at least in part, a mapping of source cluster LIN's to target cluster LIN's and vice versa. As the source cluster and the target cluster run independent operating systems and distributed file systems, it would be impractical to mirror LIN's directly and instead LIN maps can be used. As LIN's are created and modified on the source cluster and/or target cluster, they can be synced (e.g., iteratively copied) to the other cluster, and once copied, the unique source LIN of the file or directory of one cluster is associated with the unique target LIN of the other cluster.

In one implementation, if the source cluster becomes inoperable during a sync, such that files and/or directories being copied to the target cluster are in an unfinished and unknown state, the target cluster can revert to a LKG state, such that any changes partially made but not finished during the incomplete sync can revert back to just before the last sync operation began.

Referring now to FIG. 1, there is illustrated a source cluster and a target cluster after initial sync and a source cluster and a target cluster after a partial or interrupted incremental sync in accordance with implementations of this disclosure. In the top scenario, State A, the source cluster and the target cluster are synced. That is, File 1 is stored as LIN 3 and File 2 is stored as LIN 4 on the source cluster. The source cluster has a LKG state of Snapshot 5. The target cluster similarly has File 1 stored as LIN 6 and File 2 stored as LIN 9. As shown on the target cluster restates, the source LIN of 3 is mapped to a target LIN of 6 and the source LIN of 4 is mapped to a target LIN of 9. An equivalent target cluster snapshot is likely to have a different identifier than source cluster identifiers; however, it is labeled as 5' to make clear its equivalence to snapshot 5 on the source cluster.

At state B, File 1 and File 2 have been modified on the source cluster and then committed. The lock next to the files indicate a committed state. The source cluster now has a current snapshot of 7. An incremental sync job then begins to propogate changes made between snapshot 5 and 7 on the source cluster to the target cluster. At state B, File 1 has already been successfully sent to the target, so it matches the contents of File 1 on the source cluster and is therefore denoted as correlating to snapshot 7' on the target cluster. However, File 2 is still in the process of being synced, so at the time State B is reached, File 2 is in an inconsistent state. Continuing the example, the incremental sync job could be interrupted at State B due to a source cluster failure, a source power outage, etc.

Figure 2:
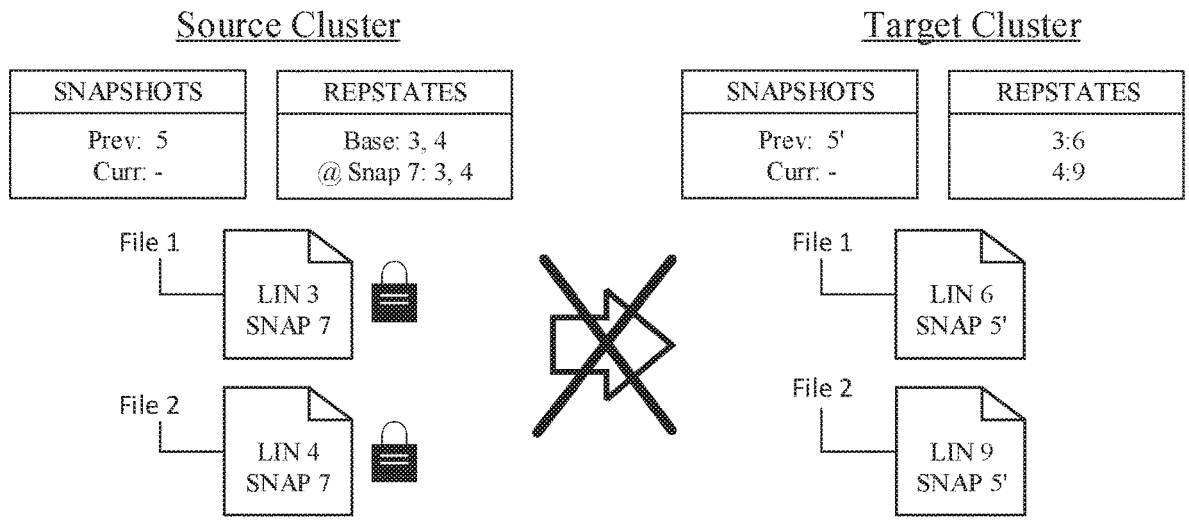
FIG. 2 illustrates a source cluster and a target cluster after an allow-write operation and a sour cluster and a target cluster after resync prep in accordance with implementations of this disclosure.
Figure 2:
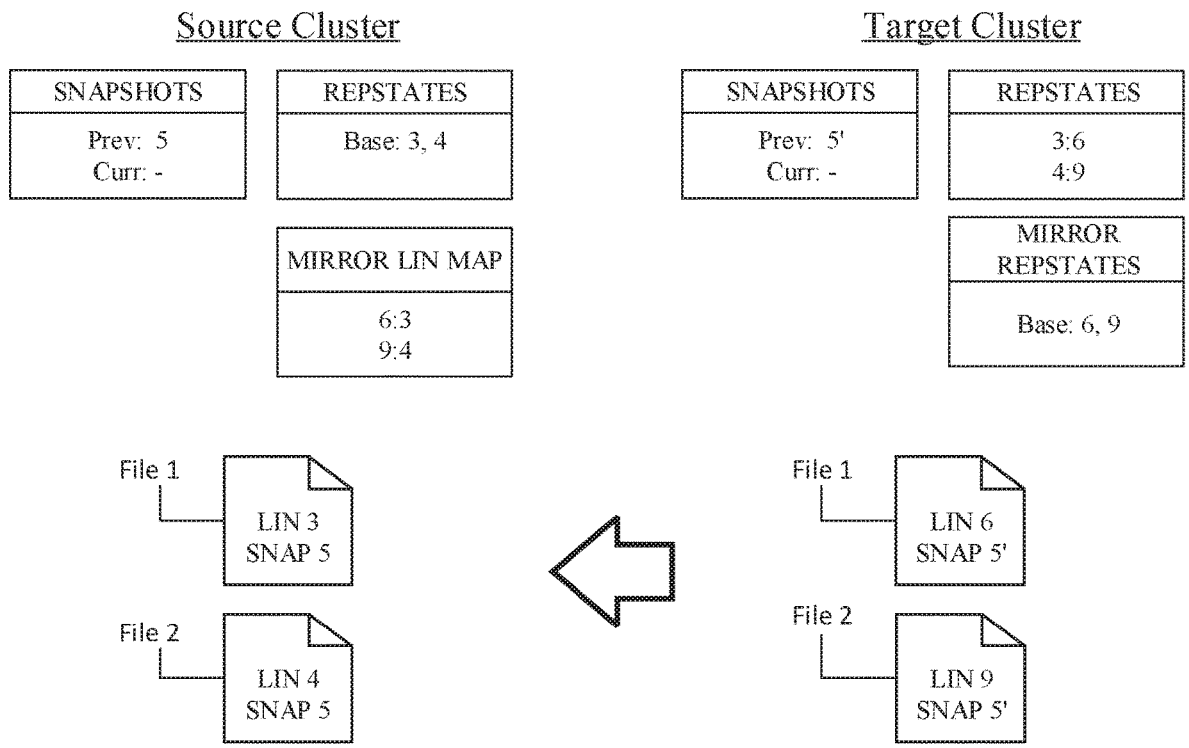

Referring now to FIG. 2, there is illustrated a source cluster and a target cluster after an allow-write operation and a sour cluster and a target cluster after resync prep in accordance with implementations of this disclosure. Continuing the example from State B in FIG. 1, after the incremental sync is interrupted at State B, a failover allow-write job could be successfully completed on the target cluster. To reach State C, the sync process would require the target cluster to overwrite File 1 which was committed at State B in FIG. 1, with it's older uncommitted version from Snapshot 5' in State A in FIG. 1. This is because an allow-write operation has a purpose to restore a target dataset to its LKG snapshot before making it writable as a failover target for former clients of the source cluster that can no longer access the source cluster.

An allow-write revert job could then return the source cluster and the target cluster to State B from State C. Conversely, a resync prep job would revert both File 1 and File 2 to their older Snap 5 versions on the source cluster, as depicted on State D, which would uncommit File 1 and File 2 on the source cluster.

In the previous examples, the basics of syncing between a source cluster and target cluster would cause a loss of committed state on target cluster files that are partially through an incremental sync and a loss of committed state on Files on a the source cluster when resync prep job operates. In both scenarios, the loss of a committed state being attached to file data may cause a lack of compliance to regulations that require retention of data.

In one implementation, the sync process can delay applying commits do all file data until the end of a sync. It can be appreciated that if a sync is interrupted, the process can be in one of three states. First, the sync could be interrupted prior to applying commits. In this state, since no files form the running sync job have been committed yet, reverting files in the recovery dataset to LKG does not result in conflicts. Second, the sync could be interrupted while applying commits. In this implementation, commits are only applied after all data is sent, so an interruption while applying commits could only require a checkpoint restart and commits can finish being applied after the interruption. Third, the sync could be interrupted after applying commits. In this stage all data is successfully sent and committed and the recovery dataset is already at LKG.

In one implementation, the sync process can accomplish delayed application of commits by creating a new target cluster side system b-tree to track which files are to be committed during the sync process. The system b-tree can maintain a list of LINs mapped to their specified retention dates that can constitute the files to be committed. During a sync, if a worker detects that it needs to commit a file, a corresponding entry can be appended to the WORM commit system b-tree. The WORM commit system b-tree can then be processed after all file data has been synced from the source cluster to the target cluster.

In one implementation, in response to WORM commit system b-tree being completely processed, a snapshot can be taken of the target and the sync process can use this snapshot as ending snapshot that indicates a successful sync has taken place. For example, if a source cluster is at Snapshot 5, a successful ending snapshot on the target would be considered 5'.

Figure 3:
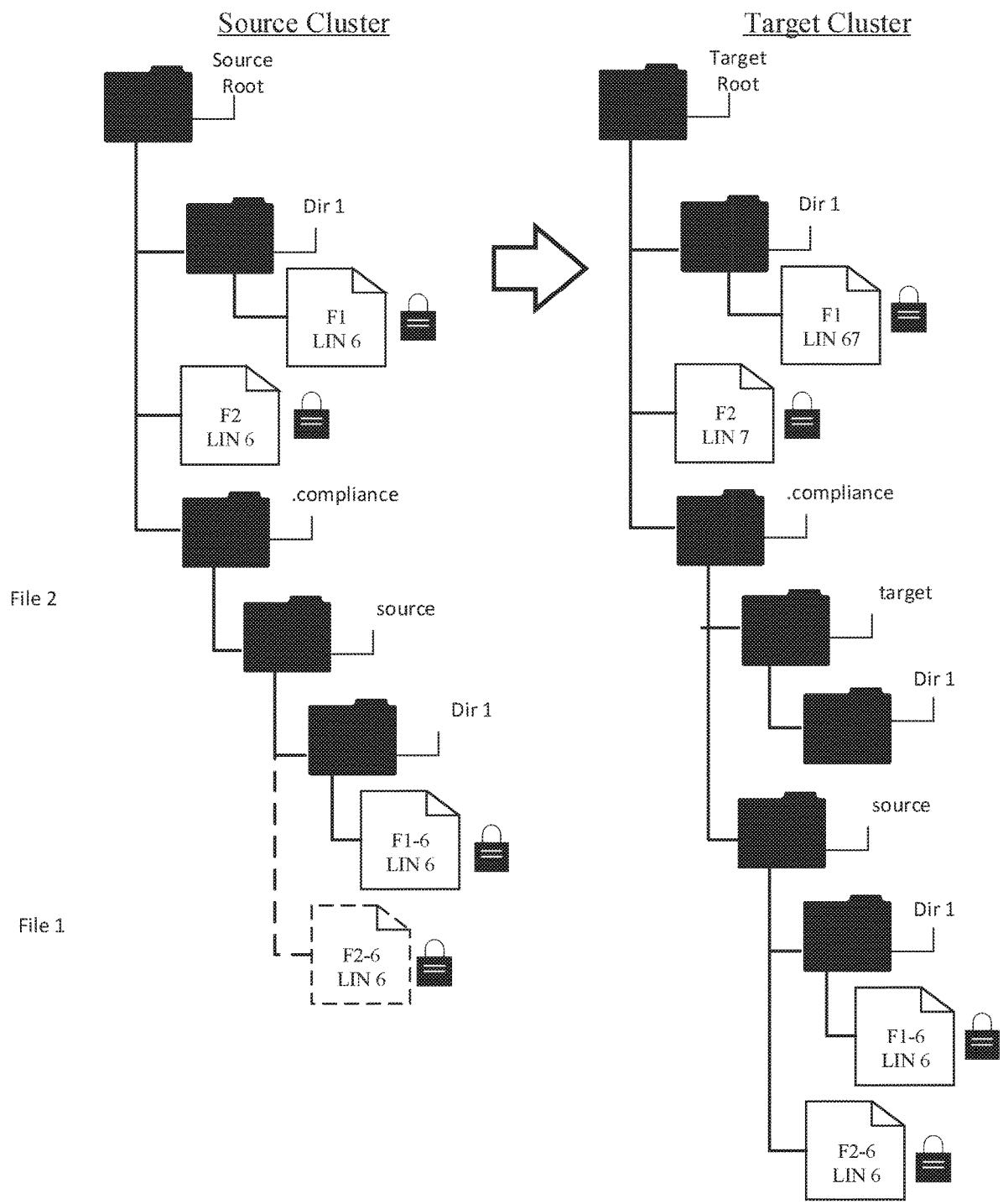
FIG. 3 illustrates a source cluster and target cluster that send pending canonical links during sync in accordance with implementations of this disclosure.

Referring now to FIG. 3, there is illustrated a source cluster and target cluster that send pending canonical links during sync in accordance with implementations of this disclosure. To address the scenarios above where allow-write and resync prep operations have the potential to lose regulatory required committed state information, all canonical links, even those still pending asynchronously as described above with respect to the compliance daemon, can be sent to the target cluster during an incremental sync.

In FIG. 3, the source cluster commits LIN 6 and the canonical link for File 1 is created in the compliance store on the source cluster. Since there is more than one link to LIN 6, it is added to the compliance daemon to be applied asynchronously at some later time. As shown in the compliance store for the source cluster, the dashed lines indicate that the operation to add F2-6 to the compliance store is pending creation asynchronously but has not yet been created.

When the target cluster receives a committed file (e.g., File 1 and File 2), the target cluster can immediately add their canonical links to the compliance store. If the file data already exists in the compliance store, then a noop can be used, and a second canonical link to the file data can be added within the compliance store. Therefore, even though the canonical link to F2-6 in the source cluster has yet to be processed prior to the incremental sync, the target cluster still receives accurate committed data, and in this example, has an updated compliance store prior to the source cluster itself. It can be appreciated that this can guarantee that on completion of a sync, the target cluster will have all of the canonical links for all of its committed files, even if the canonical links were pending creation on the source cluster.

FIGS. 4-38 illustrate a set of sequential actions taken between a source cluster and target cluster that help illustrate the implementations of this disclosure. Descriptions for these figures will focus on the changes made in each new figure compared to the previous figure in the set. These are just some examples for how the sync process works to resolve conflicts when syncs, incremental syncs, failover, and failback processes are performed between a source cluster and a target cluster. For simplicity, source and target are used to denote a source dataset and a target dataset. In one implementation, the source dataset is on a source cluster of nodes and the target dataset resides on a physically distinct target cluster of nodes. For example, in disaster recovery scenarios, the source cluster of nodes would be located physically apart from the target cluster of nodes. The numbers in parentheticals next to files and directories in FIGS. 4-38 denote LIN numbers associated with files and directories. A locking icon next to a file indicates the file has been committed. The numbers in parentheticals next to source and target designations refer to snapshot identifiers. Because snapshot identifiers may have different numbering on the source and target, the target designation ' indicates "prime" and is deemed a replica of the relevant snapshot on the source. For example, on FIG. 5, the source has a snapshot identifier of 51 and the target has a snapshot identifier of 51' that is deemed replica of the 51.

Figure 4:
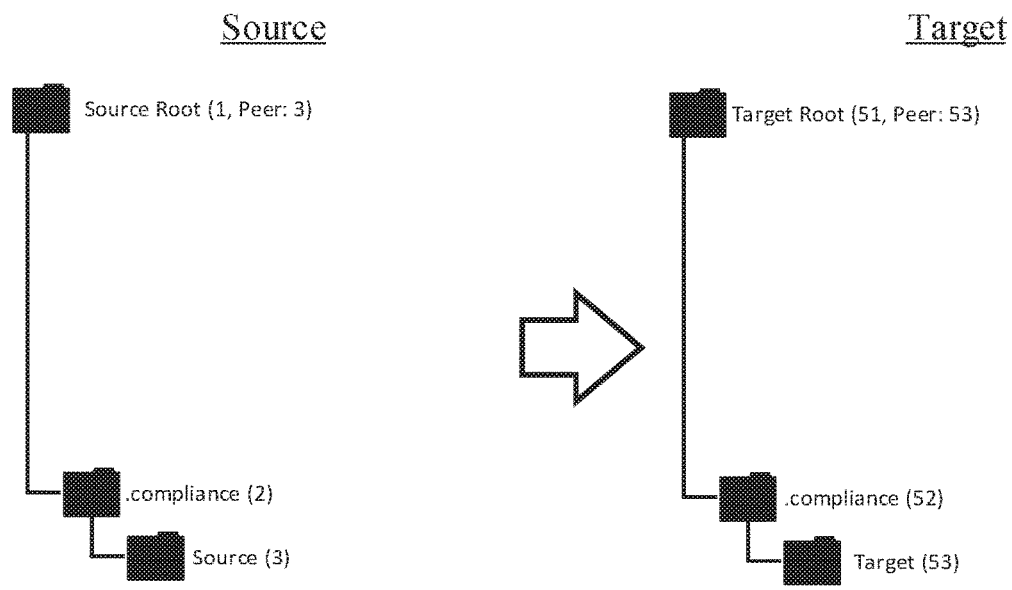
FIG. 4 illustrates a source cluster and a target cluster prior to an initial sync in accordance with implementations of this disclosure.

Referring now to FIG. 4 there is illustrated a source cluster and a target cluster prior to an initial sync in accordance with implementations of this disclosure. The source contains a source root directory that has a source LIN of 1. Within the source root is a source compliance domain (denoted .compliance (2) in the Figure). Prior to an initial synch, the source compliance domain contains a source compliance store (3). As denoted, the source compliance store (3) is a peer of the source root as it is set to mirror directories in the source root while also mirroring committed files from the source root. Similarly, the target contains a target root directory that has a target LIN of 51. Within the target root is a target compliance domain (denoted .compliance (52) in the Figure). Prior to an initial synch, the target compliance domain contains a target compliance store (53) that is a peer of the target root and has similar mirror policies to the source root and the source compliance domain.

Figure 5:
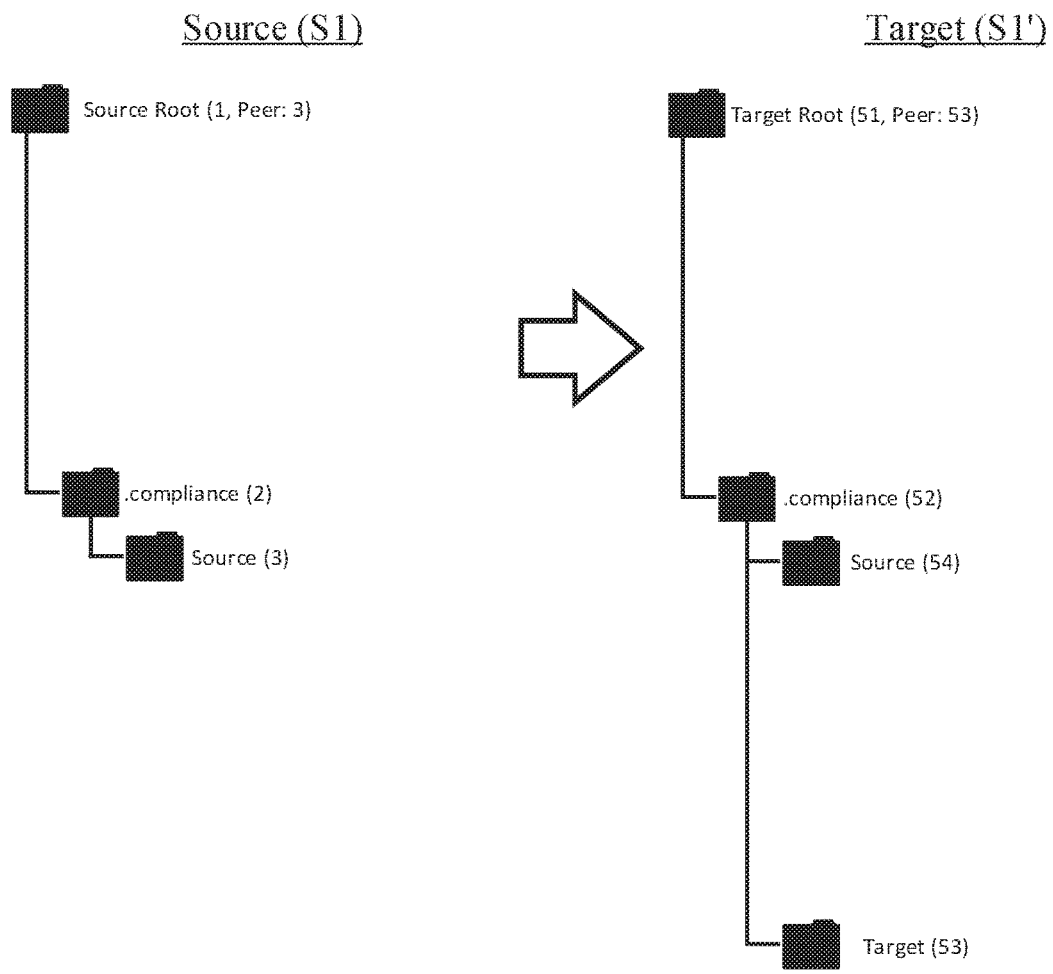
FIG. 5 illustrates a source cluster and a target cluster after an initial sync in accordance with implementations of this disclosure.

Referring now to FIG. 5 there is illustrated a source cluster and a target cluster after an initial sync in accordance with implementations of this disclosure. The source cluster has a snapshot identifier of 51 and the target has been successfully synched to snapshot identifier of 51'. As shown, the initial sync created a target resident source compliance store (54) within the target compliance domain (52). In addition, after the initial sync, the base repstates or LINs of the source e.g., source root (1), source compliance domain (2) and source compliance store (3) are now noted in the LIN MAPS on the target as source LIN 1 maps to target LIN 51, source LIN 2 maps to target LIN 52, and source LIN 3 maps to Target LIN 54. It can be appreciated that the source compliance domain does not have a source resident target compliance store at this time which need not be created until after a failback operation. Thus, in the compliance system b-tree on the target, it is noted that when data is resynced back to the source, a source resident target compliance store will need to be mapped to the target compliance store LIN 53.

Figure 6:
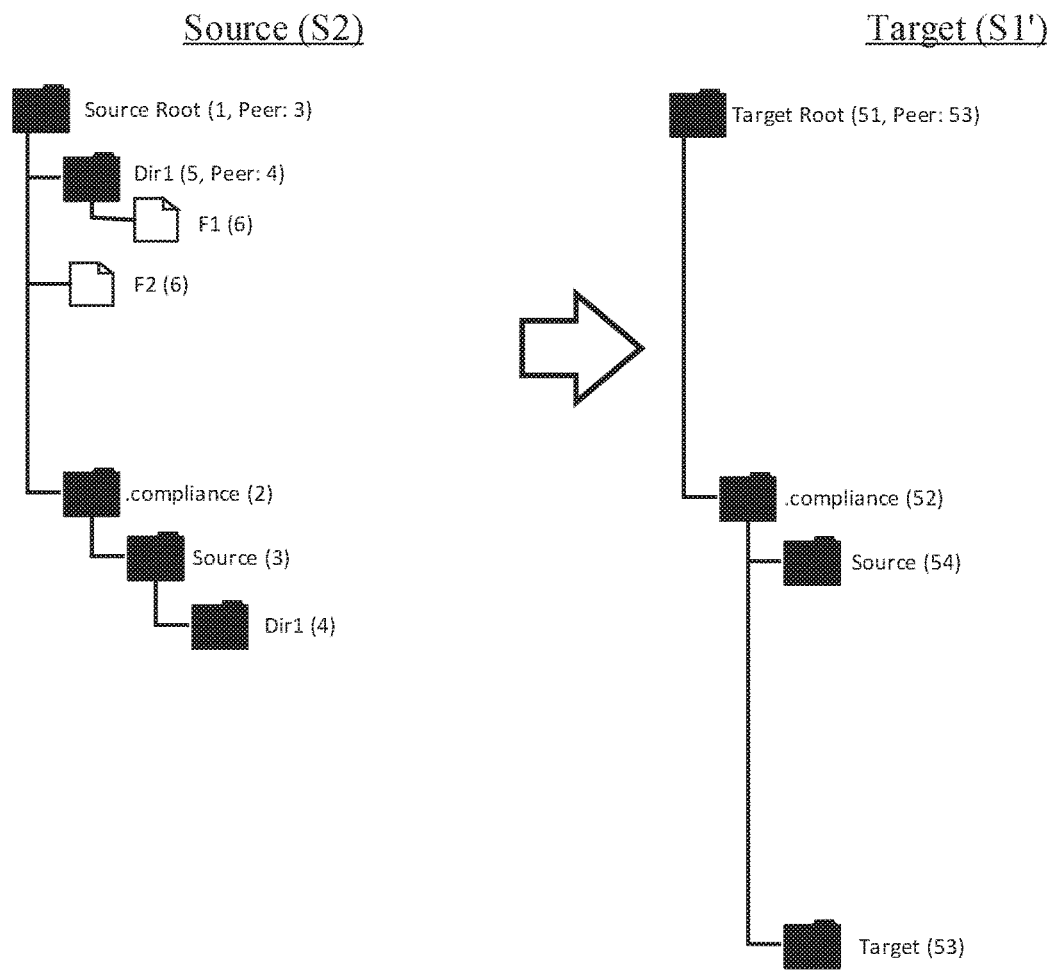
FIG. 6 illustrates a source cluster and a target cluster after changes made on the source cluster and prior to an incremental sync in accordance with implementations of this disclosure.

Referring now to FIG. 6 there is illustrated a source cluster and a target cluster after changes made on the source cluster and prior to an incremental sync in accordance with implementations of this disclosure. Dir is an abbreviation for Directory and F denotes a File. The source now has a snapshot identifier of S2 while the target is still in a state of S1'. The source has added Dir1, F1, and F2, all in an uncommitted state. Note that F1 and F2 both share a common LIN of 6 which means the files are copies. When Dir1 was added to the source root, a separate Dir1 was also added to the source compliance store. It can be appreciated that directories are mirrored to the compliance store upon creation whereas files are only generated in the compliance store when they are committed. At this stage, an incremental sync is about to begin which on the source restates is indicated by "inc" which states the LINs of the directories and files that will need to be synced to the target during the incremental sync.

Figure 7:
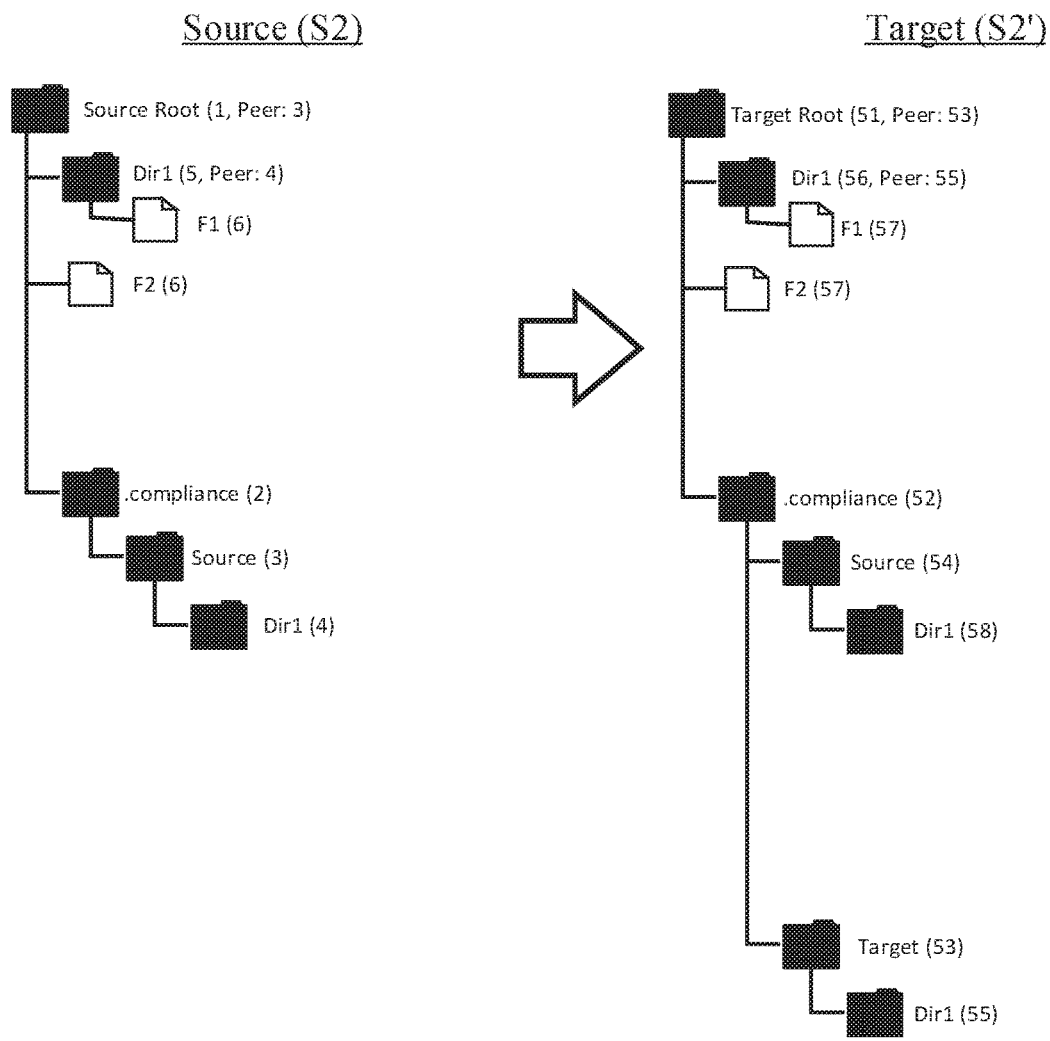
FIG. 7 illustrates a source cluster and a target cluster after an incremental sync in accordance with implementations of this disclosure.

Referring now to FIG. 7 there is illustrated a source cluster and a target cluster after an incremental sync in accordance with implementations of this disclosure. Dir1, F1, and F2 have been synced from the source to the target and are now associated with target LINs 56 and 57. Dir1 has also been replicated in the target resident source compliance store. In addition, with the introduction of Dir1 to the target root, the target compliance store also has replicated a version of Dir1 as a child. With the target now having completed the incremental sync, it now has a snapshot identifier of S2' matching the source snapshot identifier of S2. The target LIN MAPS have also been updated to reflect the addition of source compliance store Dir1 that has a source LIN of 4 and a target LIN of 58, root Dir1 that a source LIN of 5 and target LIN of 56, and root F1 and F2 that have a source LIN of 6 and a target LIN of 57.

Figure 8:
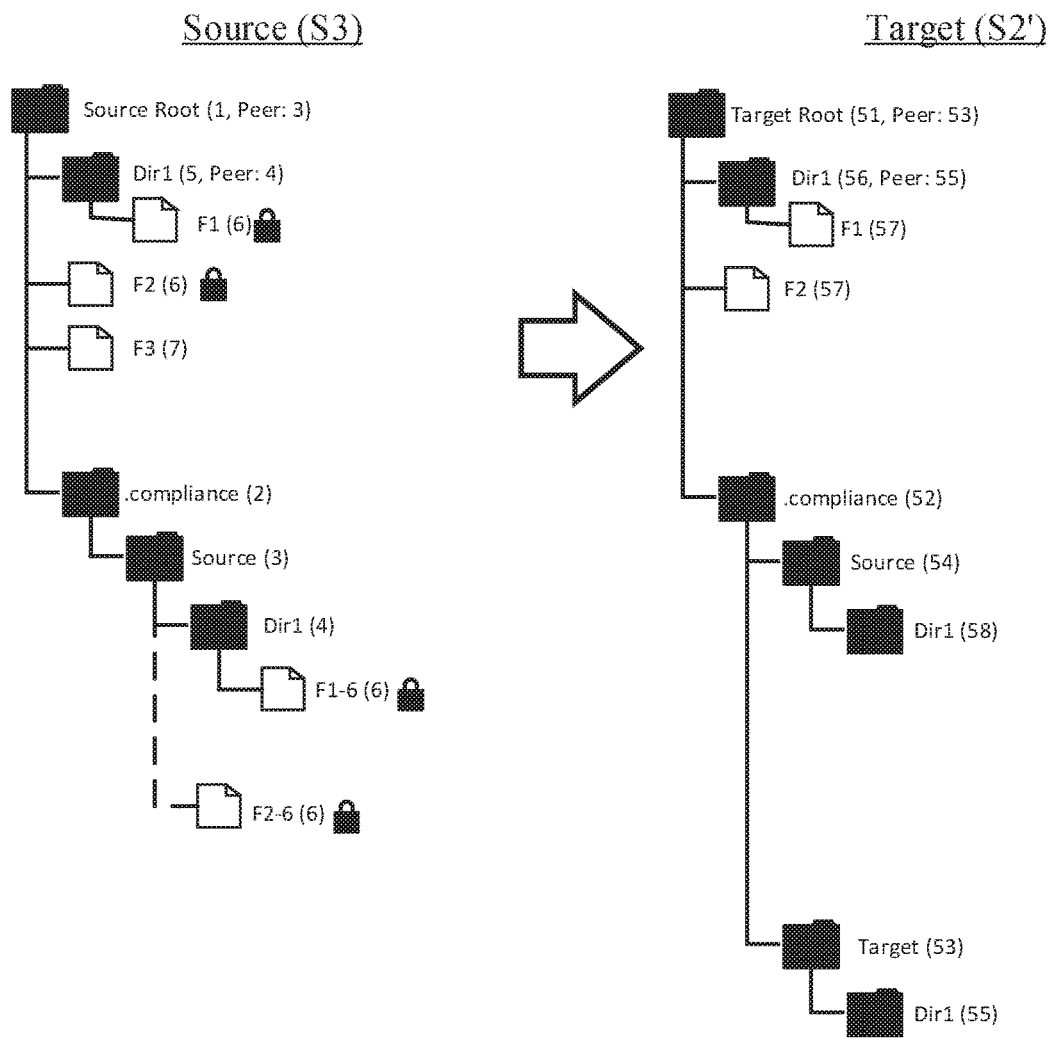
FIG. 8 illustrates a source cluster and a target cluster after files are committed on the source cluster in accordance with implementations of this disclosure.

Referring now to FIG. 8 there is illustrated a source cluster and a target cluster after files are committed on the source cluster in accordance with implementations of this disclosure. The source has added F3 to the root directory as LIN 7. The source has also received a request to commit F1 and F2 and has established a canonical link F1-6 in the source compliance store. As discussed above, remaining hardlinks to the canonical link can be processed asynchronously by a compliance Daemon. DPL signifies Daemon Pending Links, so in FIG. 8, there is a daemon pending link for LIN 6 denoted by the dashed line in the source compliance store leading to F2-6. At the start of the incremental sync, the target has added LIN 57 as a late stage commit, as discussed above, file commitments occur after file data has been synced, and thus the compliance system b-tree ("SBT") lists a commitment to LIN 57. The source has a new snapshot identifier of 23 while the target is still in its previous snapshot state of S2'.

Figure 9:
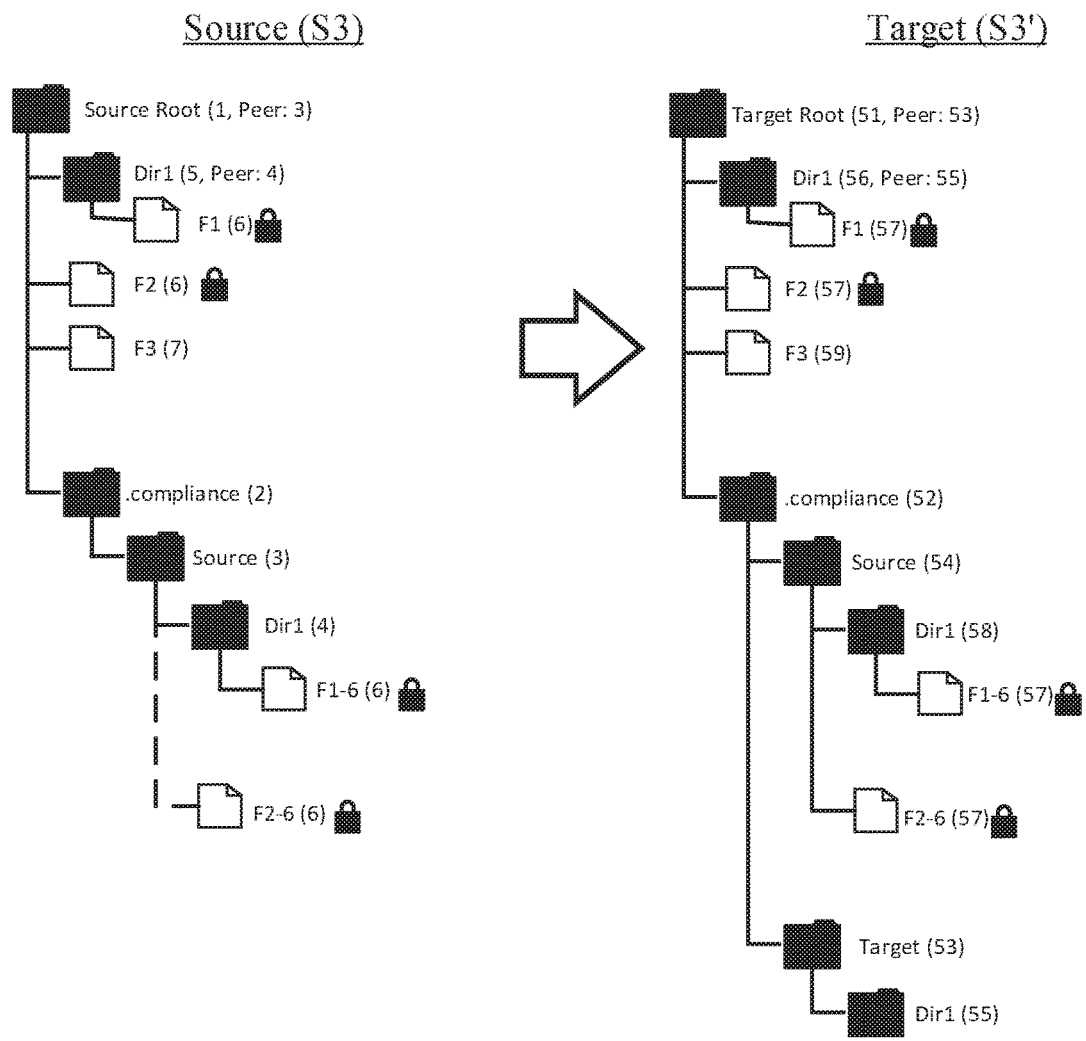
FIG. 9 illustrates a source cluster and a target cluster after an incremental sync that incorporates files committed on the source cluster in accordance with implementations of this disclosure.

Referring now to FIG. 9 there is illustrated a source cluster and a target cluster after an incremental sync that incorporates files committed on the source cluster in accordance with implementations of this disclosure. F3 has been replicated to the target root as LIN 59. The canonical link to F1-6 has been replicated the target resident source compliance store and the canonical link to F2-6 has also been created in the target resident source compliance store. It can be appreciated that the canonical link to F2 has been created on the target prior to its eventual asynchronous creation on the source, as the source DPL still has a pending link to F2-6. The target has completed the compliance SBT to LIN 57 by establishing canonical links on the target side to both F1-6 and F2-6. A new LIN MAPS entry on the target maps source LIN 7 to target LIN 59 for F3. At this stage, the sync is complete and the target has a snapshot identifier of S3' matching the source snapshot identifier of S3.

Figure 10:
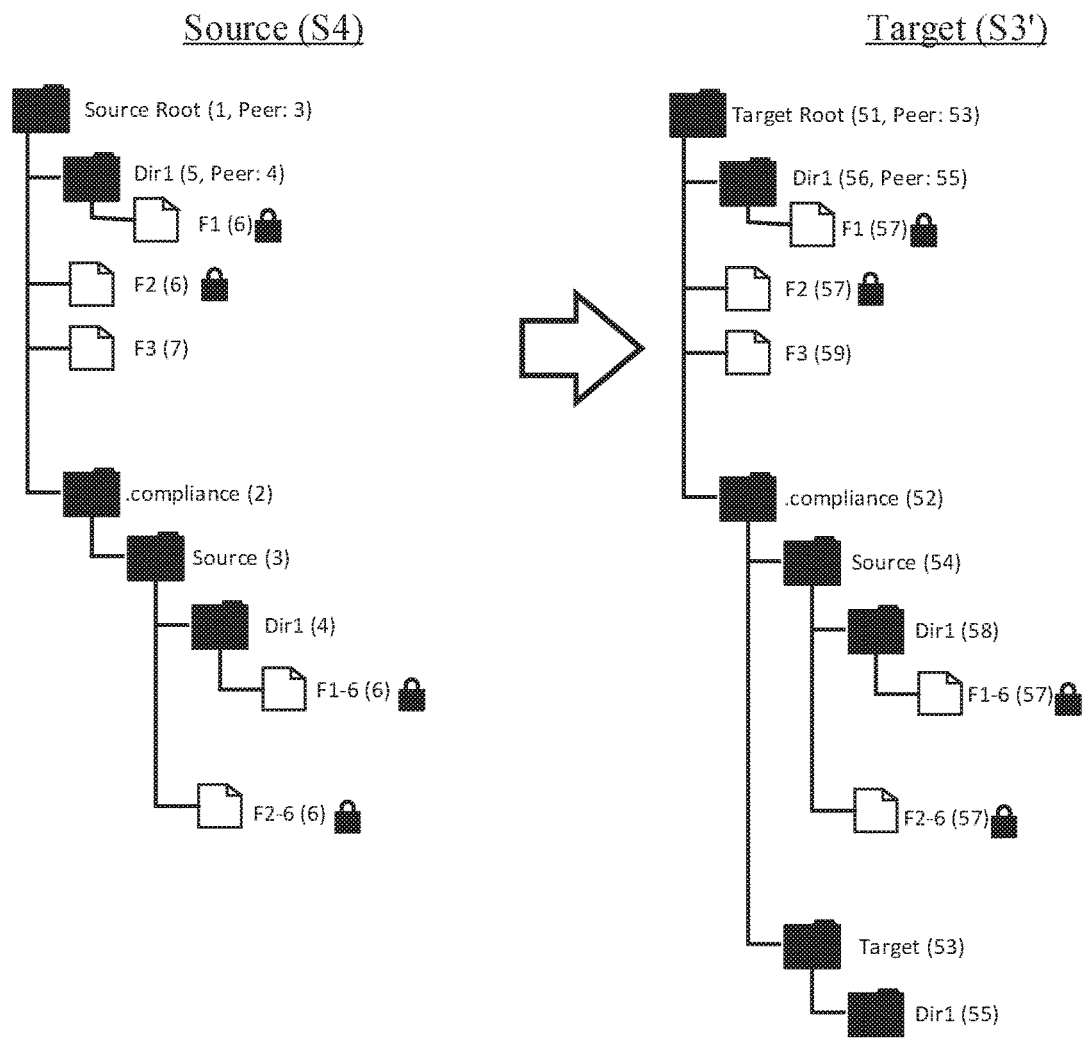
FIG. 10 illustrates a source cluster and a target cluster after a compliance store daemon creates a canonical link in accordance with implementations of this disclosure.

Referring now to FIG. 10 there is illustrated a source cluster and a target cluster after a compliance store daemon creates a canonical link in accordance with implementations of this disclosure. The compliance daemon has now processed the pending link for LIN 6 and created a hardlink for F2-6 in the source compliance store. As a result, the source is now in a new snapshot state of S4 while the target remains in its previous snapshot state of S3'

Figure 11:
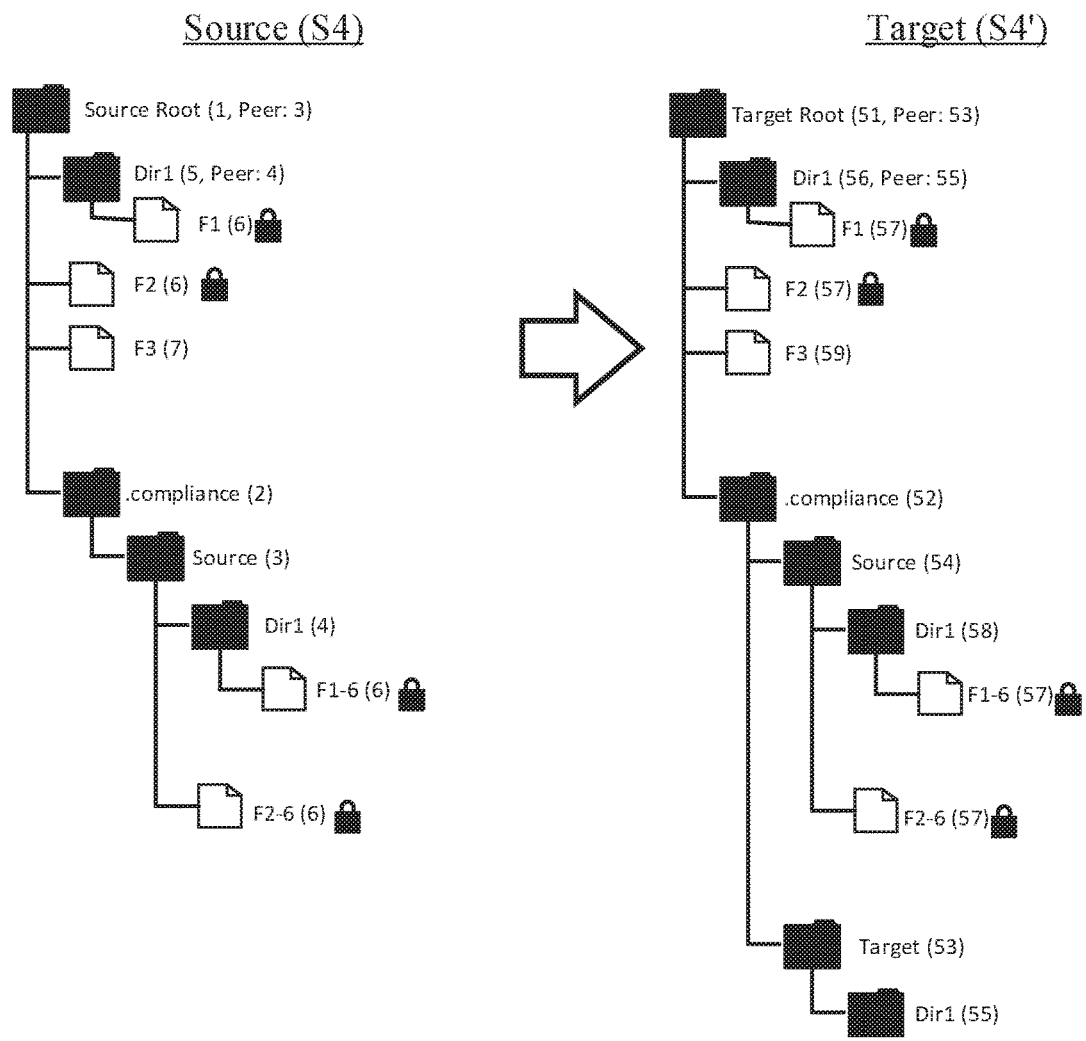
FIG. 11 illustrates a source cluster and a target cluster after an incremental sync that ignores already present canonical links on the target cluster in accordance with implementations of this disclosure.

Referring now to FIG. 11 there is illustrated a source cluster and a target cluster after an incremental sync that ignores already present canonical links on the target cluster in accordance with implementations of this disclosure. As the target has previously already processed the canonical link for F2 on the target and created F2-6 in the target resident source compliance store, the sync completes without taking action beyond updating the target snapshot identifier to S4' which matches the source snapshot identifier of S4.

Figure 12:
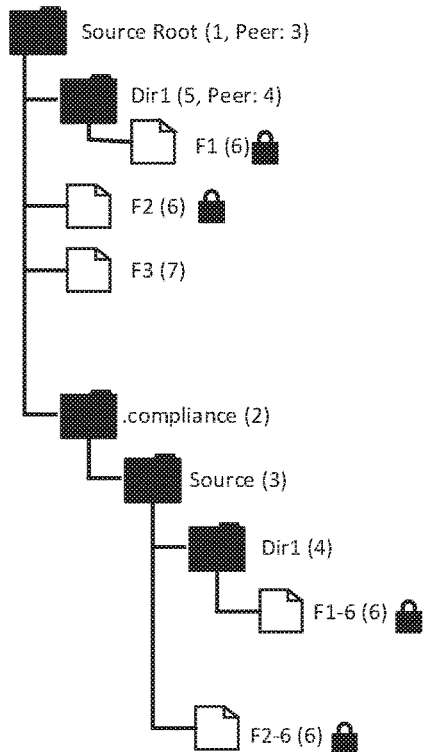
FIG. 12 illustrates a source cluster and a target cluster when the target cluster is executing an allow-write in accordance with implementations of this disclosure.
Figure 12:
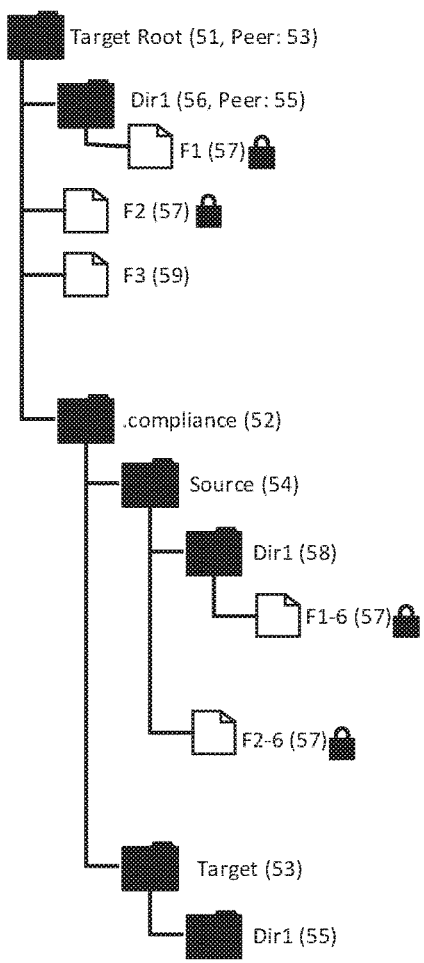

Referring now to FIG. 12 there is illustrated a source cluster and a target cluster when the target cluster is executing an allow-write in accordance with implementations of this disclosure. The target by executing an allow-write creates a new snapshot identifier S5 that is equivalent to S4'. The allow-write operation purpose is to restore a target dataset to its LKG snapshot and make the dataset writable in preparation for a failover operation.

Figure 13:
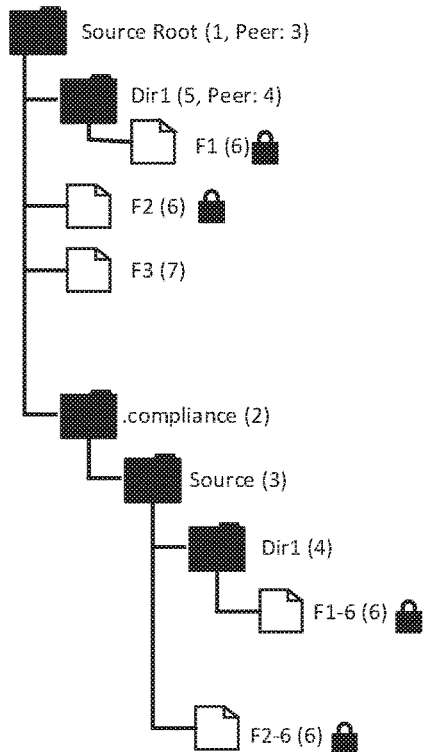
FIG. 13 illustrates a source cluster and a target cluster after the target cluster has executed an allow-write in accordance with implementations of this disclosure.
Figure 13:
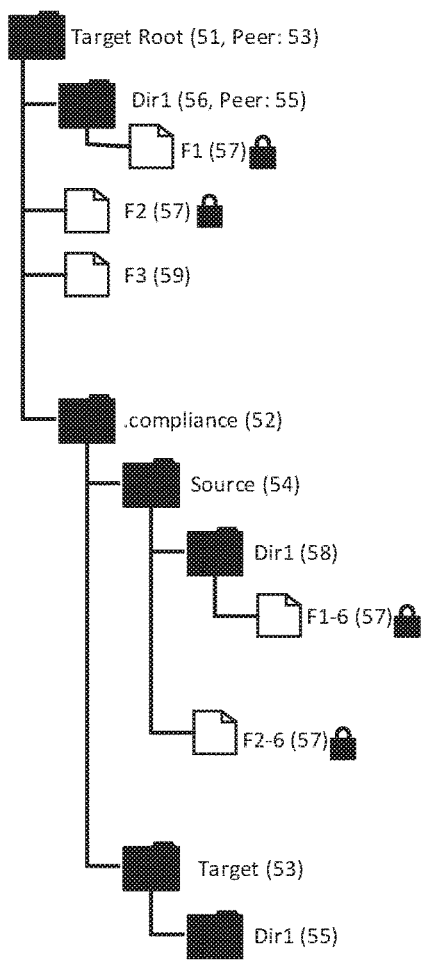

Referring now to FIG. 13 there is illustrated a source cluster and a target cluster after the target cluster has executed an allow-write in accordance with implementations of this disclosure. The allow-write operation has determined that the target is already at LKG state. Therefore, a new snapshot is taken on the target S6, and the allow write operation completes.

Figure 14:
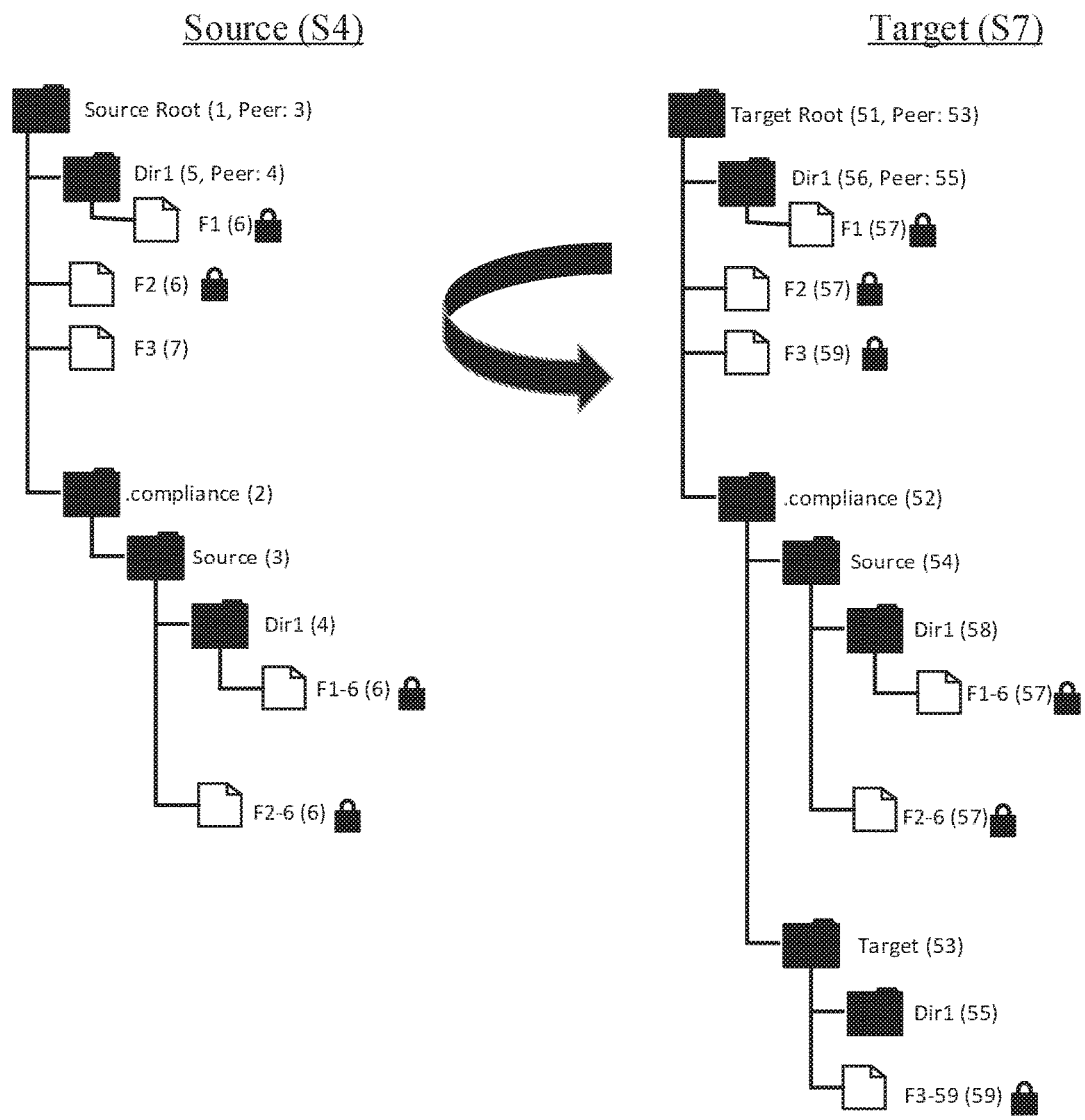
FIG. 14 illustrates a source cluster and a target cluster after the target has made changes and then executes an allow-write revert in accordance with implementations of this disclosure.

Referring now to FIG. 14 there is illustrated a source cluster and a target cluster after the target has made changes and then executes an allow-write revert in accordance with implementations of this disclosure. The target cluster processes a request to commit F3 with a target LIN of 59. In committing F3, the target adds a canonical link F3-59 to the target compliance store. After committing F3, the target then executes an allow-write revert which will attempt to put the target into LKG prior to the allow-write. However, with F3 being committed after the allow-write, committed files must be retained according to policy. Therefore, LIN 59 is added to conflict list. The target now has a snapshot identifier of S7 while the source still has a snapshot identifier of S4.

Figure 15:
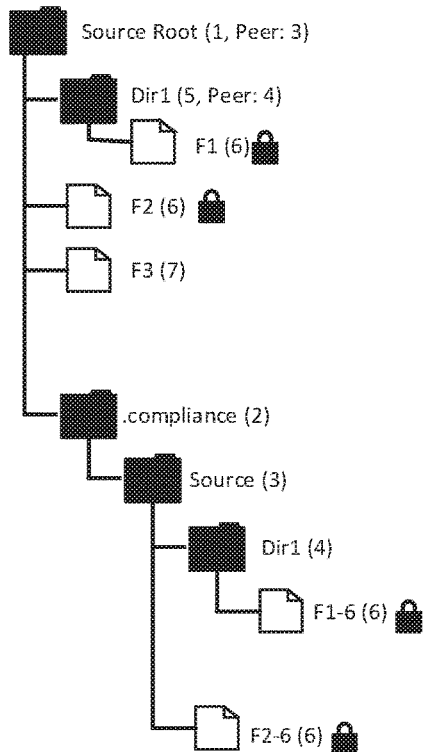
FIG. 15 illustrates a source cluster and a target cluster after executing an allow-write revert in accordance with implementations of this disclosure.
Figure 15:
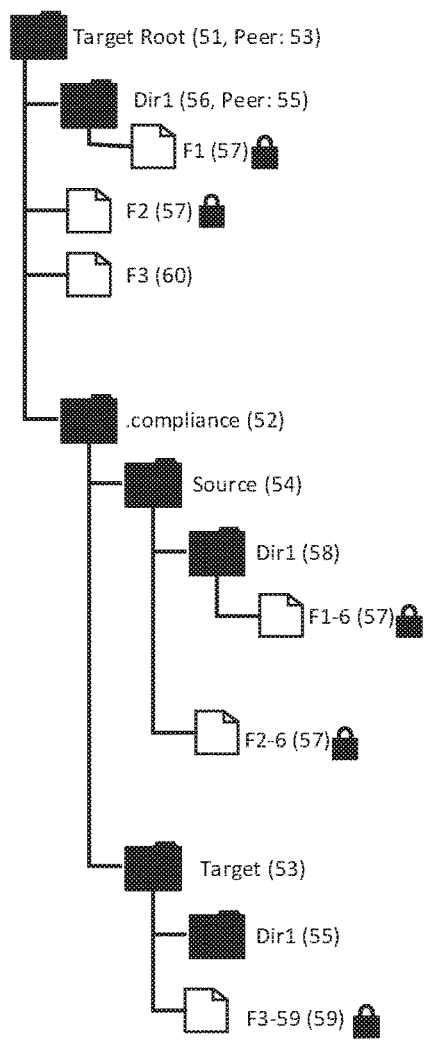

Referring now to FIG. 15 there is illustrated a source cluster and a target cluster after executing an allow-write revert in accordance with implementations of this disclosure. In an operation for an allow-write revert, the LKG state prior to the allow write had F3 as non-committed. Thus, F3 can be restored to LIN 60 and LIN 59 can be set for resync and new mapping from LIN 59 to LIN 60. Note that the LIN MAPS still maps source LIN 7 to LIN 59; however, the compliance mapping now maps LIN 59 to LIN 60. LIN 59 still remains as it is canonically linked to F3-59 which remains in the target compliance store even after the allow-write revert removes the committed state attached to F3. This maintains compliance with regulations that require the retention of committed files, while still allowing the allow-write revert to put the state of the file system back in an LKG state that would otherwise violate committed file requirements. The target now has a snapshot identifier of S8 while the source still has a snapshot identifier of S4.

Figure 16:
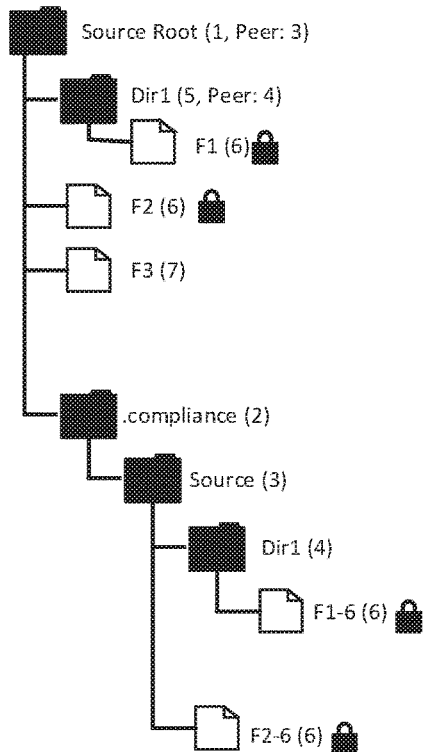
FIG. 16 illustrates a source cluster and a target cluster after the target cluster executes an allow-write in accordance with implementations of this disclosure.
Figure 16:
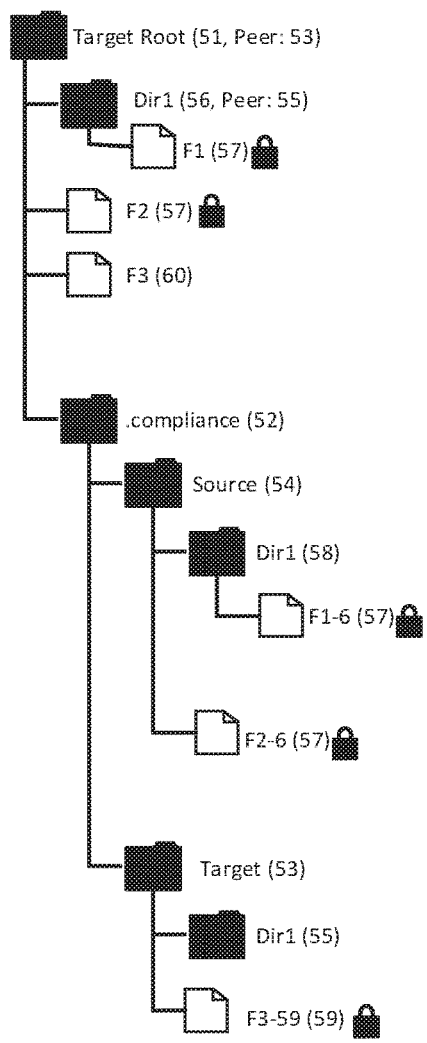

Referring now to FIG. 16 there is illustrated a source cluster and a target cluster after the target cluster executes an allow-write in accordance with implementations of this disclosure. The target now executes an allow write, and as a result, will attempt to process any file commitments. With no new files to commit, the target has a new snapshot identifier of S9.

Figure 17:
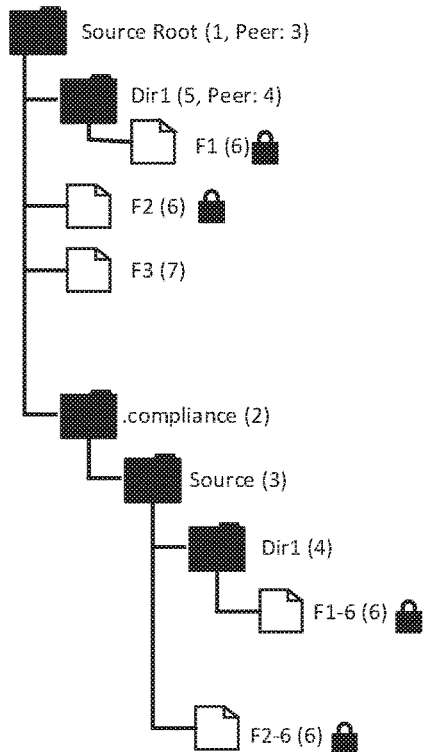
FIG. 17 illustrates a source cluster and a target cluster at a last known good state after an allow write completes in accordance with implementations of this disclosure.
Figure 17:
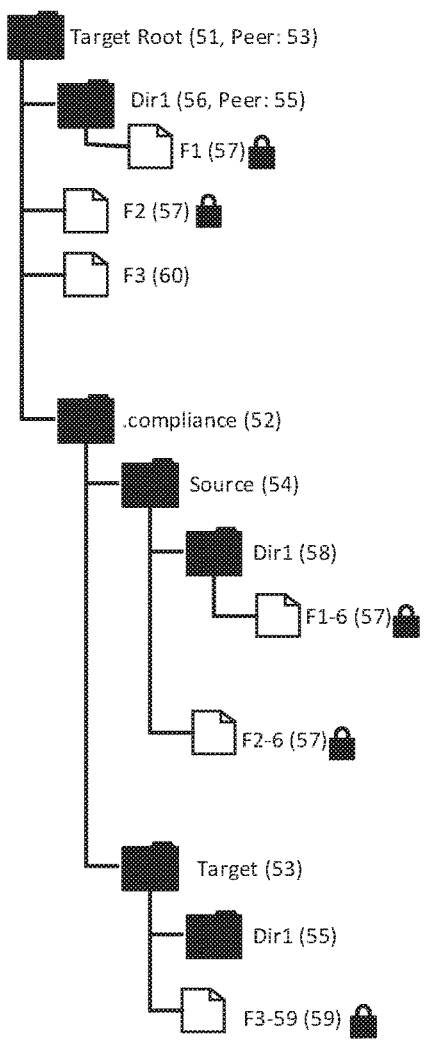

Referring now to FIG. 17 there is illustrated a source cluster and a target cluster at a last known good state after an allow write completes in accordance with implementations of this disclosure. After completion of the allow write, the target establishes a new snapshot identifier of S10 which is equivalent in the respective root directories to the source snapshot identifier of S4.

Figure 18:
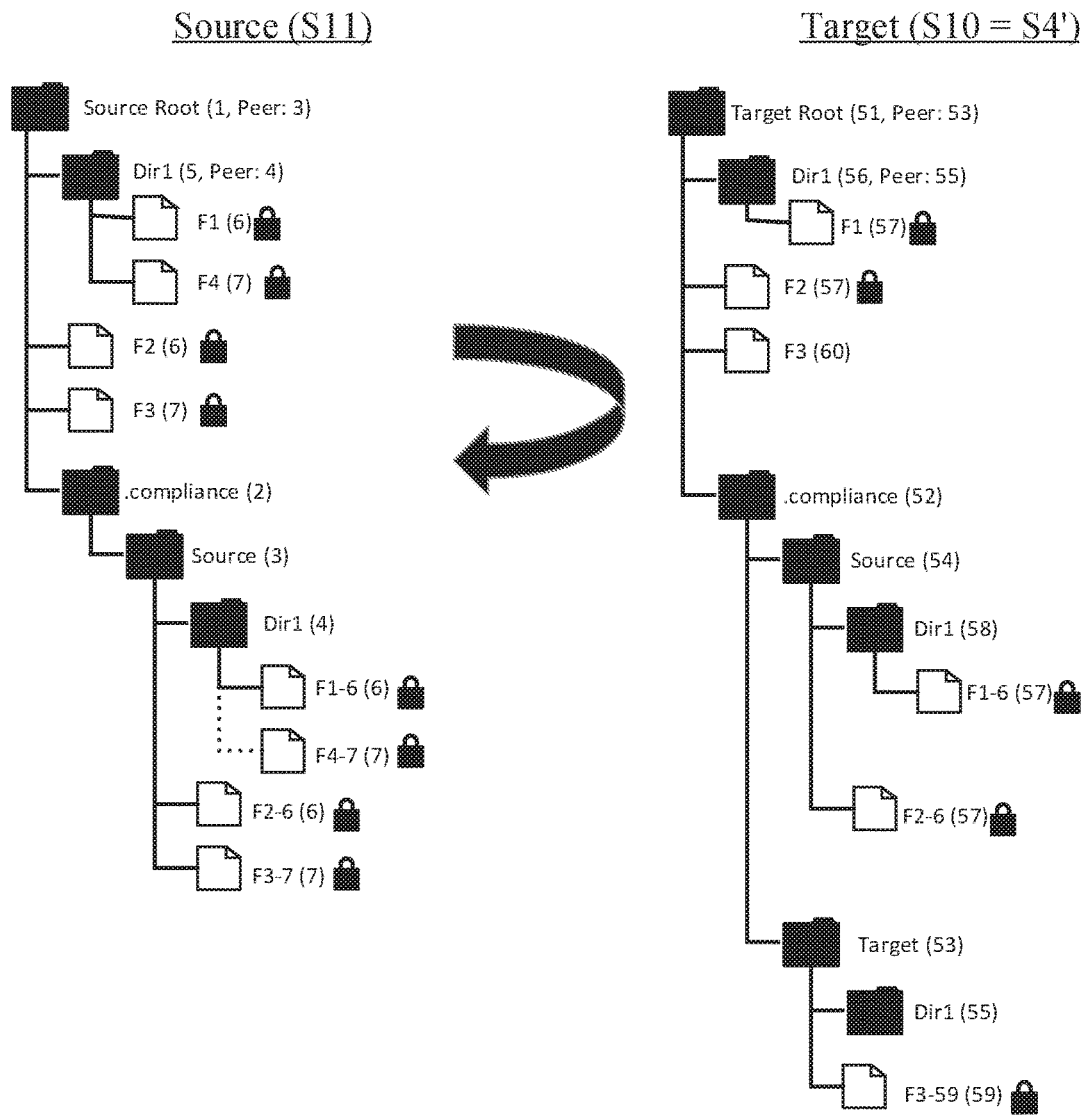
FIG. 18 illustrates a source cluster and a target cluster after changes made on the source cluster lead to the source executing a resync prep in accordance with implementations of this disclosure.

Referring now to FIG. 18 there is illustrated a source cluster and a target cluster after changes made on the source cluster lead to the source executing a resync prep in accordance with implementations of this disclosure. Here the target cluster is still operating in an allow write state; however, the source cluster is also now receiving writes and modifications to files. The source has added F4 which is a hard link (e.g., shares the same LIN) to F3. The source then commits both F3 and F4. The source can then add a canonical link to F3-7 as LIN 7 in the source compliance store. As stated above, remaining hard links to the same LIN can be added asynchronously to the source compliance store, therefore the canonical link to F4-7 is added to the daemon pending links on the source to be processed later. The source is now at a new snapshot state of S11 just prior to executing a resync prep which is a job with a purpose to reverse the direction of a sync (e.g., sync from the target back to the source).

As part of a resync prep, the source should revert to a LKG snapshot state prior to the resync. In this example, the LKG snapshot for the source prior to the allow write on the target was S4. In an S4 state, as shown in FIG. 17, F3 was not committed and F4 does not exist on the source. By reverting the source to a snapshot state of S4, the source would lose the commitment to both F3 and F4 as well as remove the existence of F4 in the source root. Therefore, a conflict now exists with LIN 7 as reverting the Source to S4 state would violate the rules for retaining files that have been committed.

Figure 19:
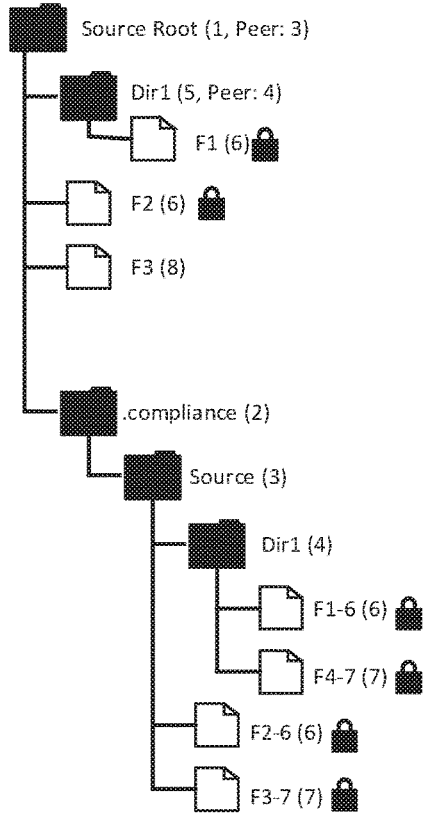
FIG. 19 illustrates a source cluster and a target cluster after the source executes a resync prep restore in accordance with implementations of this disclosure.
Figure 19:
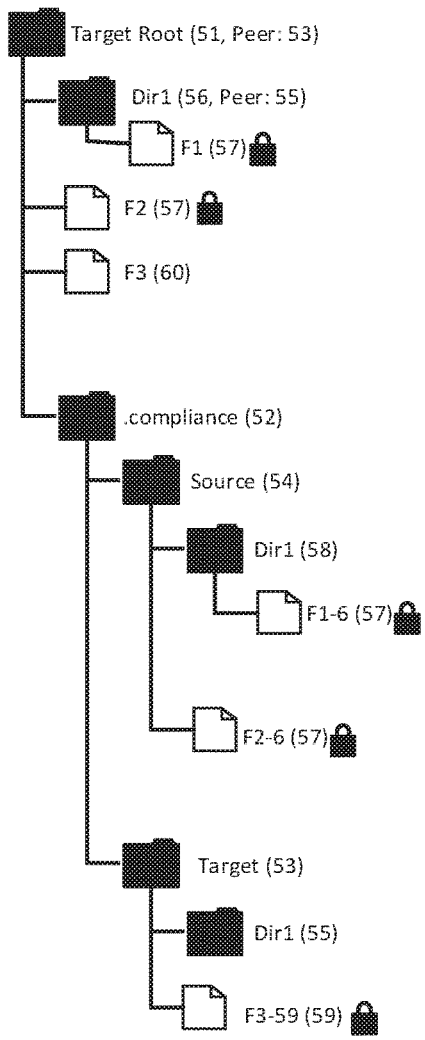

Referring now to FIG. 19 there is illustrated a source cluster and a target cluster after the source executes a resync prep restore in accordance with implementations of this disclosure. The canonical link for F4-7 in the source compliance store has been processed by the daemon pending link queue and is now a hard link. Because canonical links exist for both F4-7 and F3-7 in the source compliance store, F3 can be restored as an uncommitted file with a new compliance map from LIN 7 (now a canonical link in the compliance store) to LIN 8 that can act like an uncommitted LIN in the source root. The conflict has now been processed. A source LIN MAPS list has been prepared that maps LINs from the target to the source in preparation of a resync. At this point, the source is now has a snapshot identifier of S12 that correlates with the previous snapshot identifier of S4 in how the source root directory outside the compliance store should look to clients of the source cluster.

Figure 20:
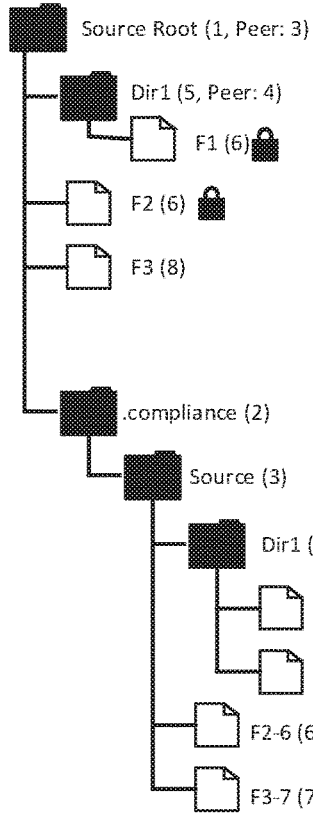
FIG. 20 illustrates a source cluster and a target cluster after the source executes resync prep in accordance with implementations of this disclosure.
Figure 20:
Figure 20:
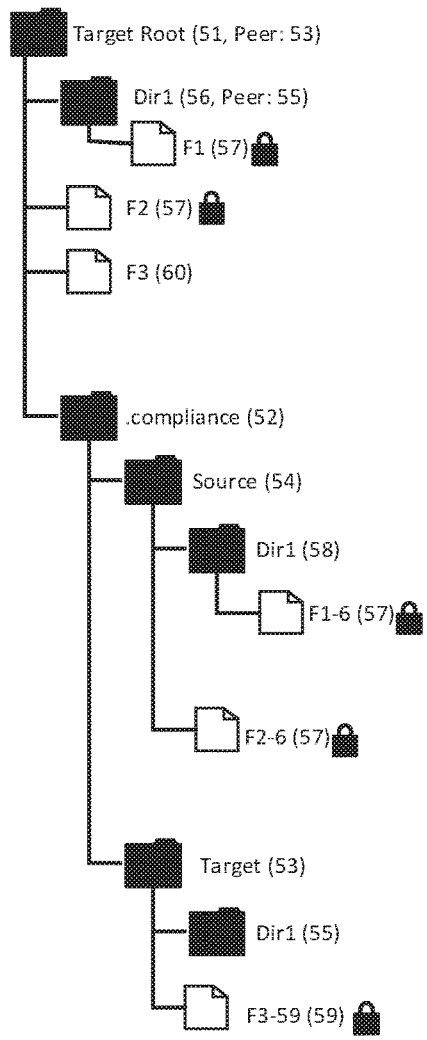

Referring now to FIG. 20 there is illustrated a source cluster and a target cluster after the source executes resync prep in accordance with implementations of this disclosure. While the source root directory outside the compliance store has been reverted, the final stage of the resync prep is resolving the LIN mappings. The compliance map that maps previous LIN 7 to LIN 8 on the source can be sent to the target to update the target LIN MAPS whereby the 7>59 entry first becomes 8>59. The target can then send its compliance map that maps target LIN of 59 to a LIN of 60 back to the source. Thus the source LIN MAPS can update its 59>7 entry to a 60>8 entry and the target LIN MAPS can update its 8>59 entry to 8>60. The resync prep is now complete.

Figure 21:
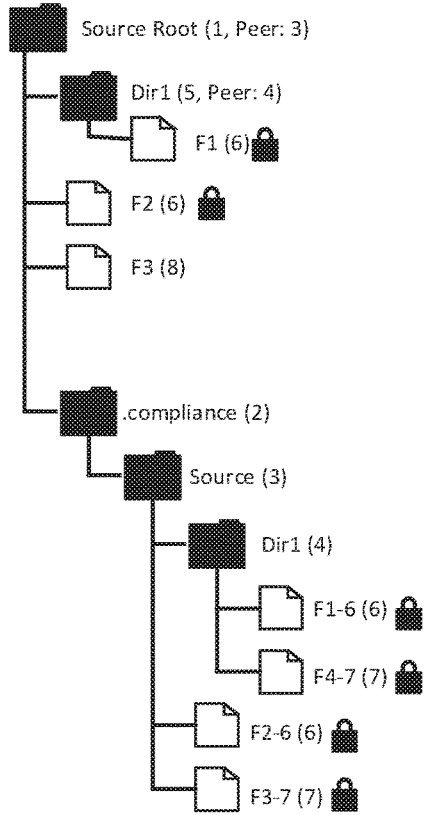
FIG. 21 illustrates a source cluster and a target cluster after commitments made to the target cluster and preparation for a failback resync in accordance with implementations of this disclosure.
Figure 21:
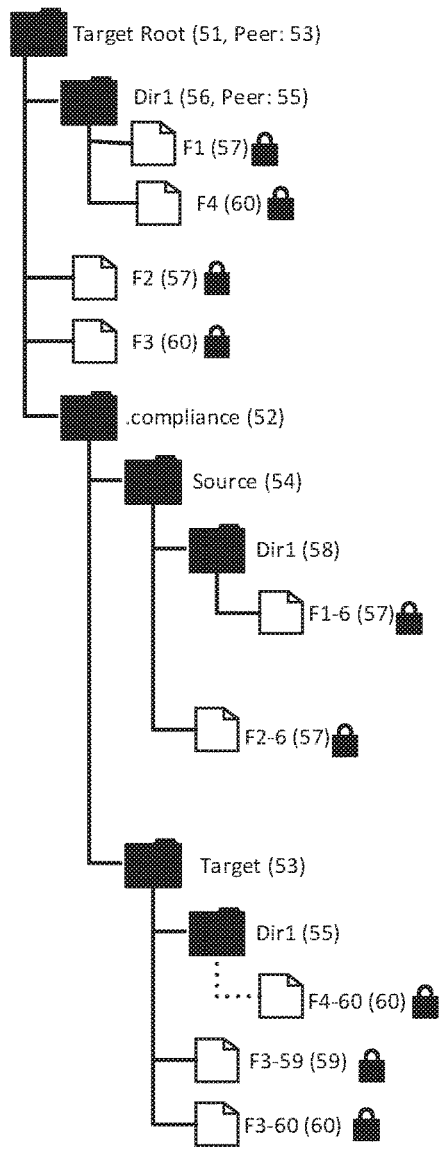

Referring now to FIG. 21 there is illustrated a source cluster and a target cluster after commitments made to the target cluster and preparation for a failback resync in accordance with implementations of this disclosure. After the source completed the resync prep operation in FIG. 20, changes are made on the target where F4 is created that hardlinks to LIN 60 with F3 and LIN 60 is committed. The canonical link to F3-60 is created in the target compliance store and a daemon pending link is added to the target for the creation of the canonical link to F4-60 in the target compliance store. As LIN 60 has already been added as a canonical link to the target compliance store with F3-60, the creation of the canonical link for F4-60 can occur asynchronously at a later time as discussed above. The target LINS of 53 (target compliance store), 55 (Dir1 in the target compliance store), and 60 (canonical link to F3-60 and eventually asynchronously F4-60) have been added to the increment sync list on the target. The snapshot of the target is now at an identifier of S13 and a failback resync has now been triggered to begin. At the onset of the failback resync, it can be appreciated as disclosed above, LIN 8 on the source can be associated with a late stage commit (CMT on the CMP SBT on the source) that only occurs after file data from the target is synced to the source.

Figure 22:
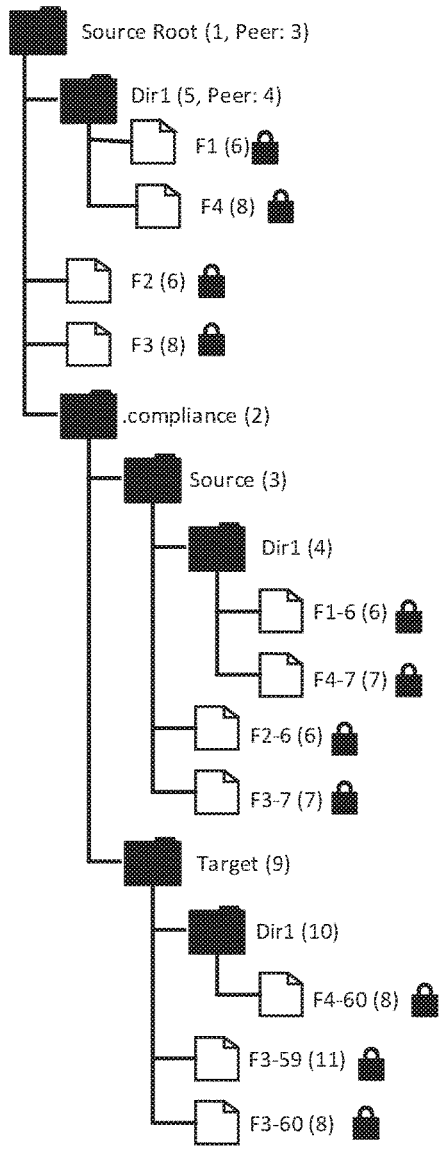
FIG. 22 illustrates a source cluster and a target cluster after failback resync in accordance with implementations of this disclosure.
Figure 22:
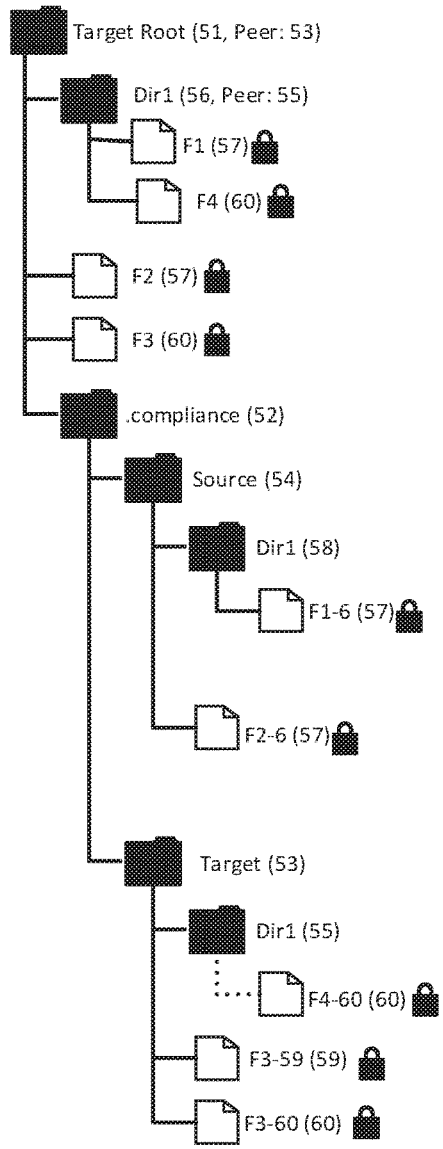

Referring now to FIG. 22 there is illustrated a source cluster and a target cluster after failback resync in accordance with implementations of this disclosure. F4 has been created on the source. A source resident target compliance store ("Target (9)") is created on the source and mirror to match the target compliance store. The source LIN MAPS have been updated to match the LINS from the target compliance store to the source resident target compliance store.

As the file data has been synced, the late stage commit to LIN 8 occurs on the source and the source commits LIN 8 meaning F3 and F4 are now committed on the source. The canonical link for source resident target compliance store files of F3-60 and F4-60 are also committed as late stage commits. It can be appreciated that F4-60 in the source resident target compliance store is committed in the source while the target still has a daemon pending link for F4-60 in the target compliance store to be completed asynchronously at a later point in time. The source now has a snapshot identifier of S13' indicating that its client facing root directory matches that of the target S13 which still remains the writable client facing file system.

Figure 23:
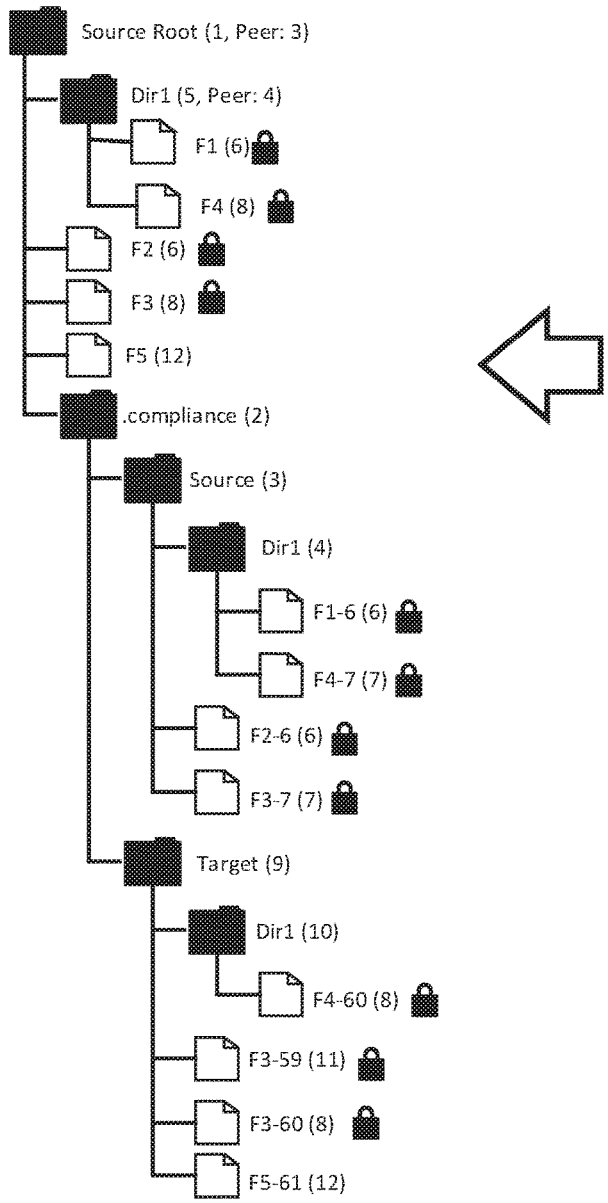
FIG. 23 illustrates a source cluster and a target cluster after the target cluster creates and a commits a file and a failback resync syncs data to the source cluster in accordance with implementations of this disclosure.
Figure 23:
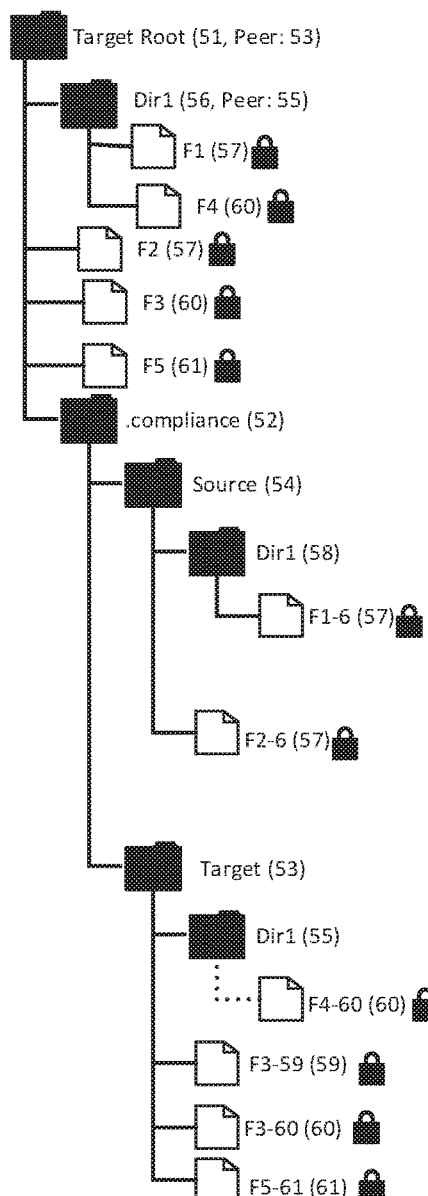

Referring now to FIG. 23 there is illustrated a source cluster and a target cluster after the target cluster creates and a commits a file and a failback resync syncs data to the source cluster in accordance with implementations of this disclosure. The target has created and committed LIN 61 which is associated with F5 on the target cluster. Another failback resync then begins to sync the change to the source. The sync replicates F5 on the source as LIN 12 and adds F5-61 to the source resident target compliance store. The source then sets LIN 12 for a late stage commitment in accordance with implementations of this disclosure. The target now has a snapshot identifier of S14 while the source is still at a snapshot identifier of S13' as the failback resync has not completed.

Figure 24:
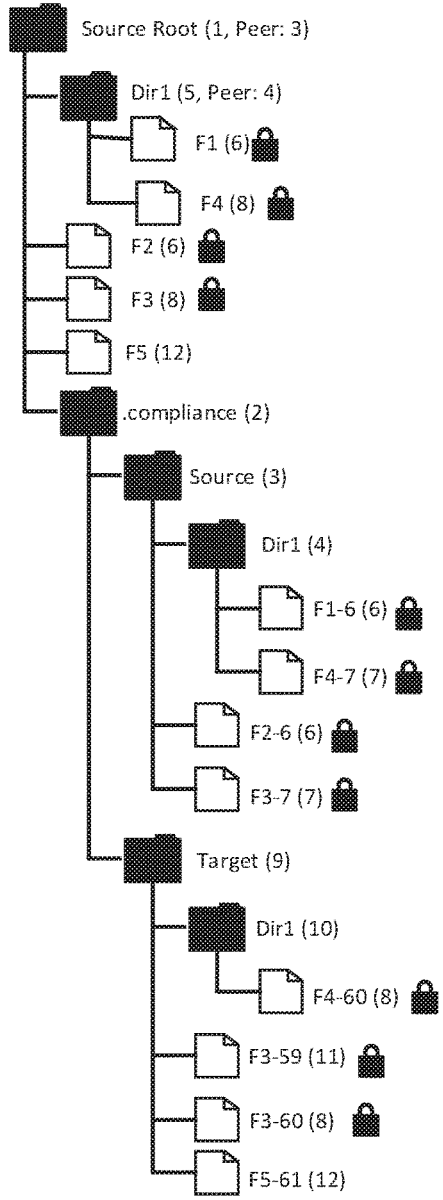
FIG. 24 illustrates a source cluster and a target cluster after failback resync failure in accordance with implementations of this disclosure.
Figure 24:
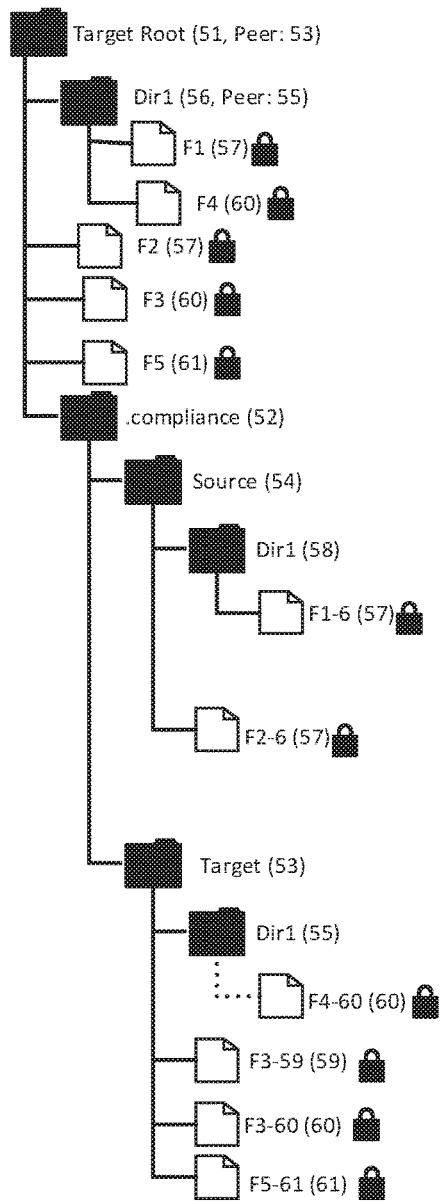

Referring now to FIG. 24 there is illustrated a source cluster and a target cluster after failback resync failure in accordance with implementations of this disclosure. While the source cluster begins to process the late stage commitments reference in FIG. 23, the sync fails and the process stops. As disclosed above, a sync failure after file data has been transferred but prior to late stage commits being applied is able to restart and eventually reapply the late stage commits without failing the sync in its entirety and reverting the source back to a LKG state. Thus, the pending CMT of LIN 12 on the source still remains. It can be appreciated that the Source is at a snapshot state of S13' with some changes that aren't equivalent to either S13' or S14'.

Figure 25:
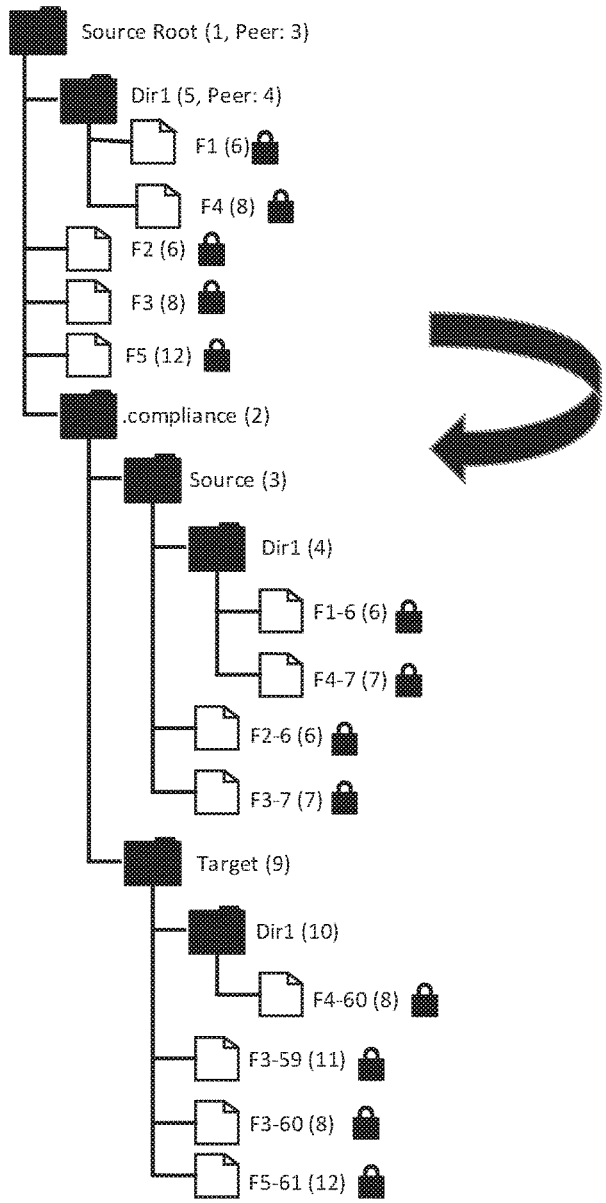
FIG. 25 illustrates a source cluster and a target cluster after executing a source allow-write in accordance with implementations of this disclosure.
Figure 25:
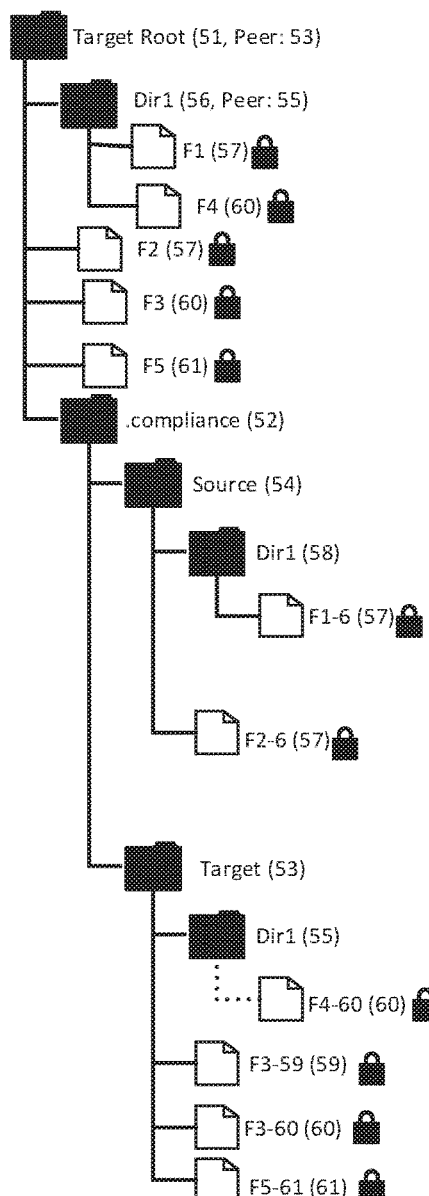

Referring now to FIG. 25 there is illustrated a source cluster and a target cluster after executing a source allow-write in accordance with implementations of this disclosure. The source is now executing an allow-write operation. Prior to completing the allow-write operation, the pending commitments are first made. LIN 12 is then processed in the pending CMT and F5 and F5-61 are now committed on the source. The source snapshot identifier is now at S15.

Figure 26:
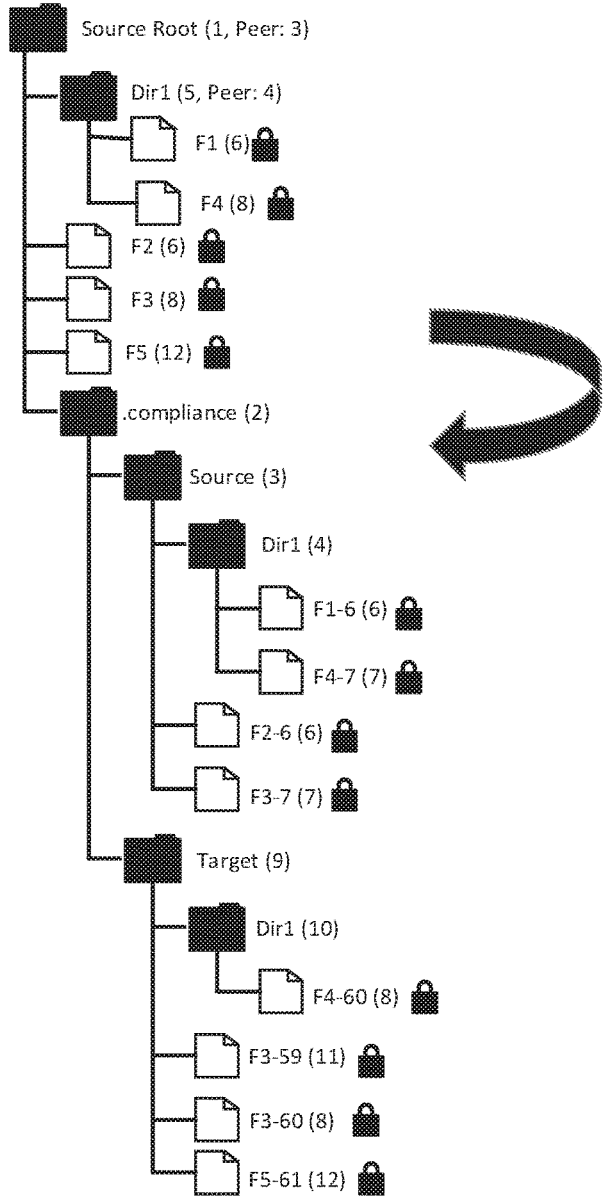
FIG. 26 illustrates a source cluster and a target cluster at last known good state after executing a source allow-write in accordance with implementations of this disclosure.
Figure 26:
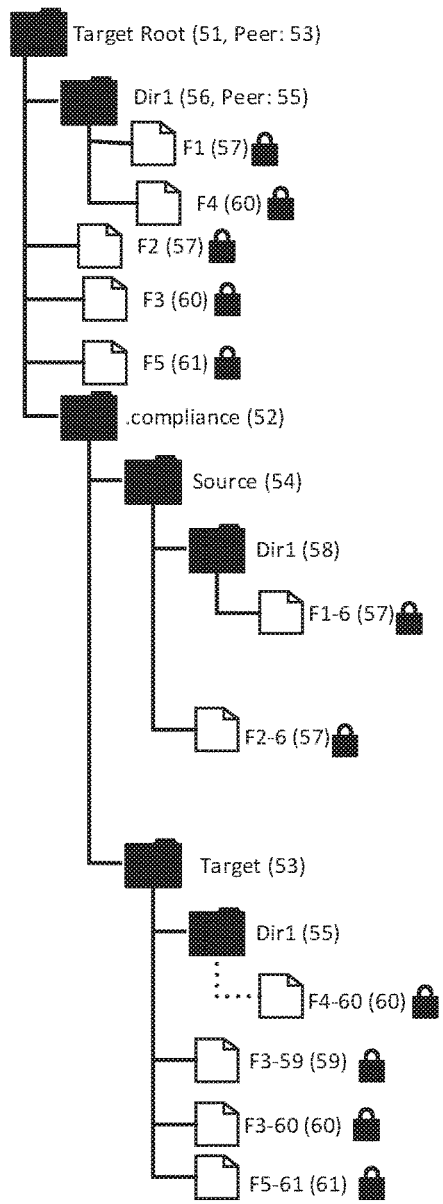

Referring now to FIG. 26 there is illustrated a source cluster and a target cluster at last known good state after executing a source allow-write in accordance with implementations of this disclosure. As the late stage commitments are now processed, the sync process can take a new snapshot S16 and consider it as a successful snap to the failback resync, meaning that S16 is now equivalent to S14'. With the source successfully sync from the target, the allow-write operation is can complete and clients can failback to the source.

Figure 27:
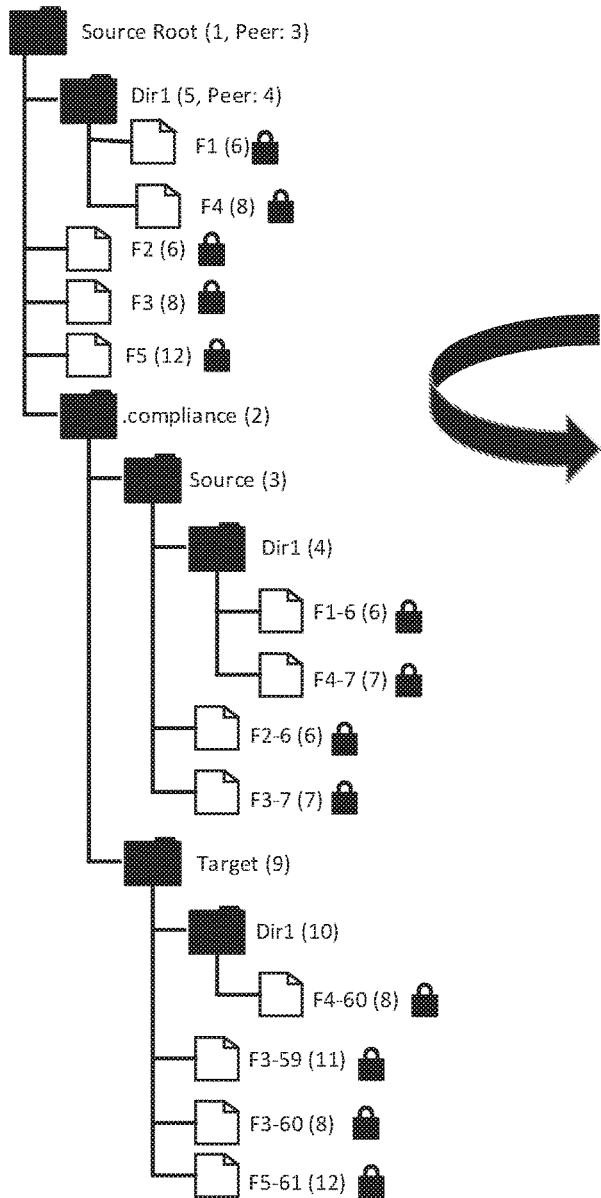
FIG. 27 illustrates a source cluster and a target cluster while the target cluster executes a resync prep in accordance with implementations of this disclosure.
Figure 27:
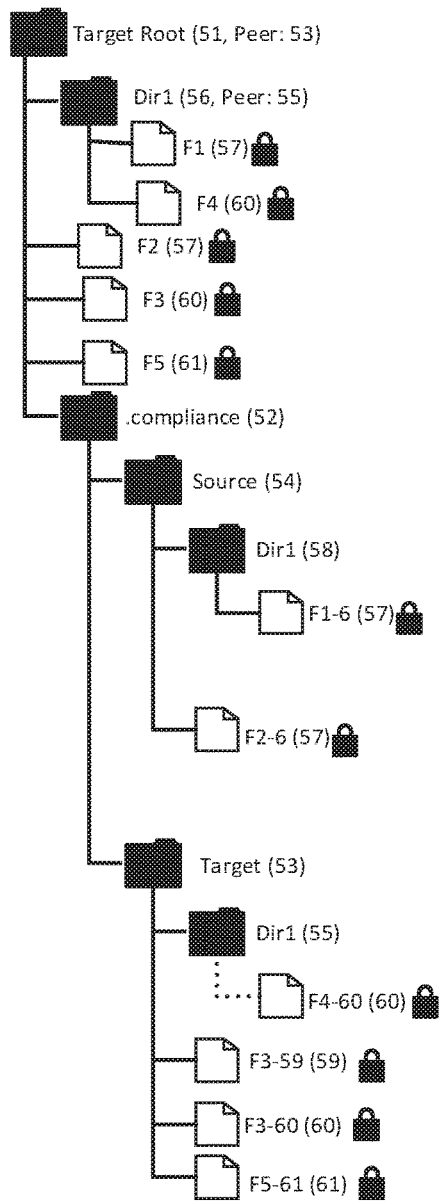

Referring now to FIG. 27 there is illustrated a source cluster and a target cluster while the target cluster executes a resync prep in accordance with implementations of this disclosure. The target executes another resync prep operation. The target can detect that the source has committed LIN 12 (e.g., target LIN 61). The target can merge their incremental restate into the base restate. The target can now generate a successful failback resync report. The target now has a snapshot identifier of S17.

Figure 28:
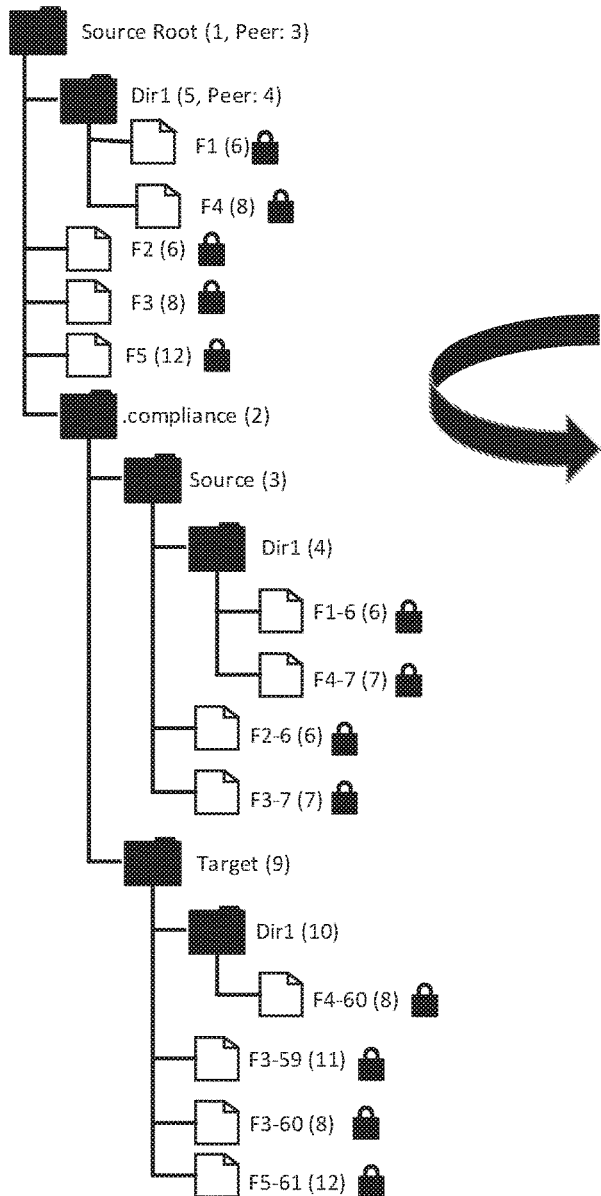
FIG. 28 illustrates a source cluster and a target cluster after the target cluster executes a resync prep in accordance with implementations of this disclosure.
Figure 28:
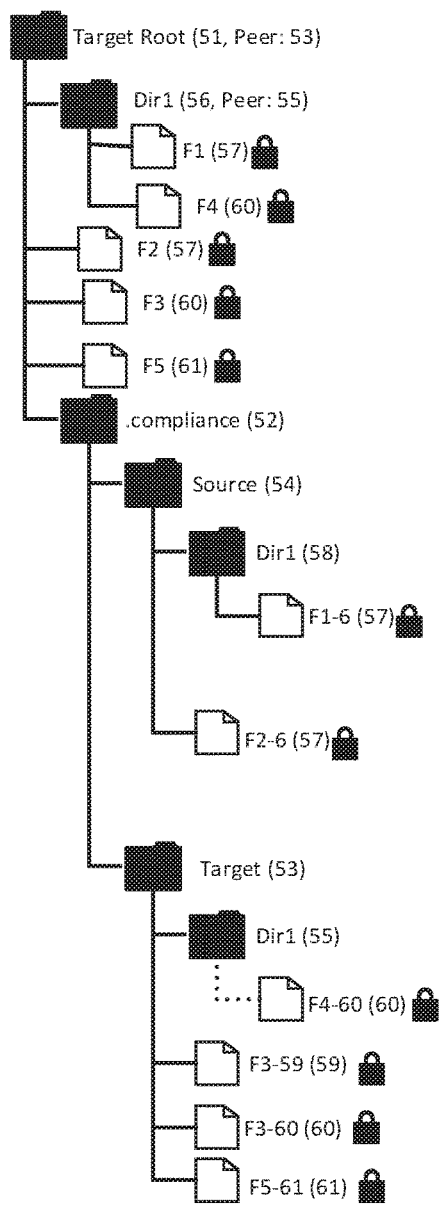

Referring now to FIG. 28 there is illustrated a source cluster and a target cluster after the target cluster executes a resync prep in accordance with implementations of this disclosure. It can be determined that the target is at LKG. LIN MAPS and restates can be transferred back to a base status. The resync prep completes and the target now has a snapshot identifier of S18 which is correlates to S14 with the source correlating to a snapshot identifier of S14'.

Figure 29:
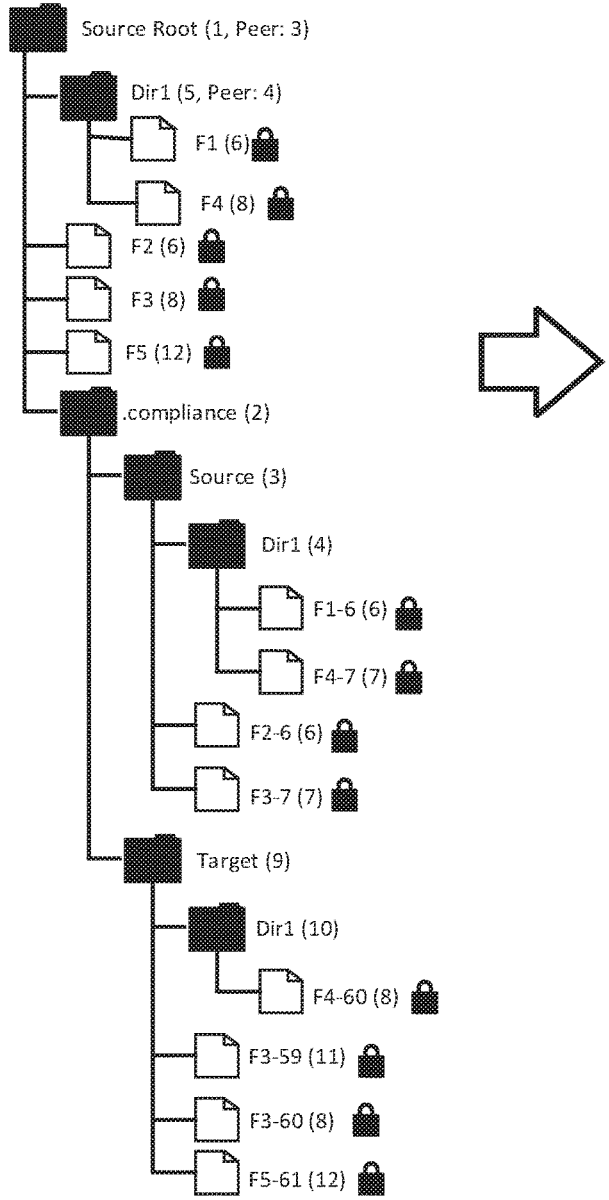
FIG. 29 illustrates a source cluster and a target cluster while the source cluster beings an incremental sync to the target cluster in accordance with implementations of this disclosure.
Figure 29:
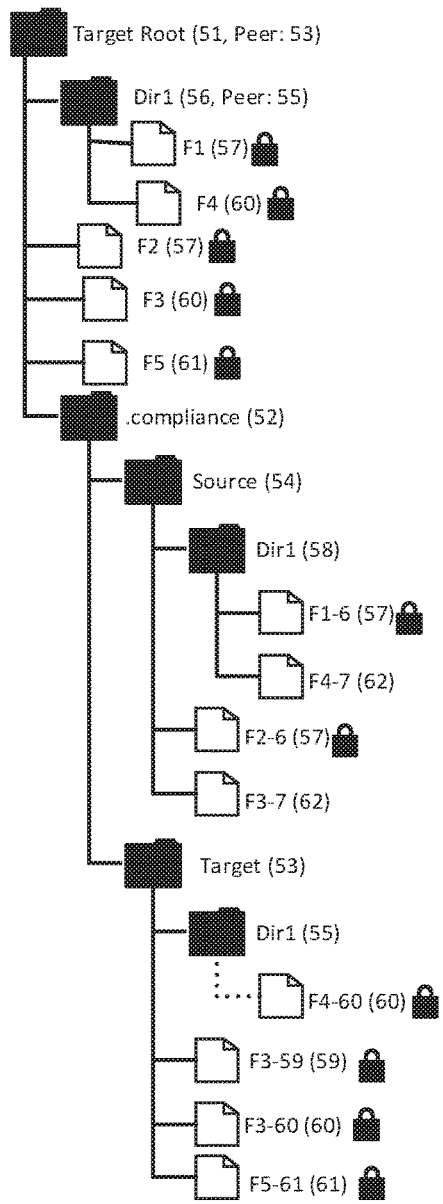

Referring now to FIG. 29 there is illustrated a source cluster and a target cluster while the source cluster beings an incremental sync to the target cluster in accordance with implementations of this disclosure. The source begins an incremental sync to the target. The source resync LIN 7 from the source to the target. File data is synced from the source to new target LIN 62 in the target resident source compliance store and the file commit to LIN 62 on the target is scheduled as a late stage commit. The source takes a snapshot at the start of the increment sync and has a new snapshot identifier of S19.

Figure 30:
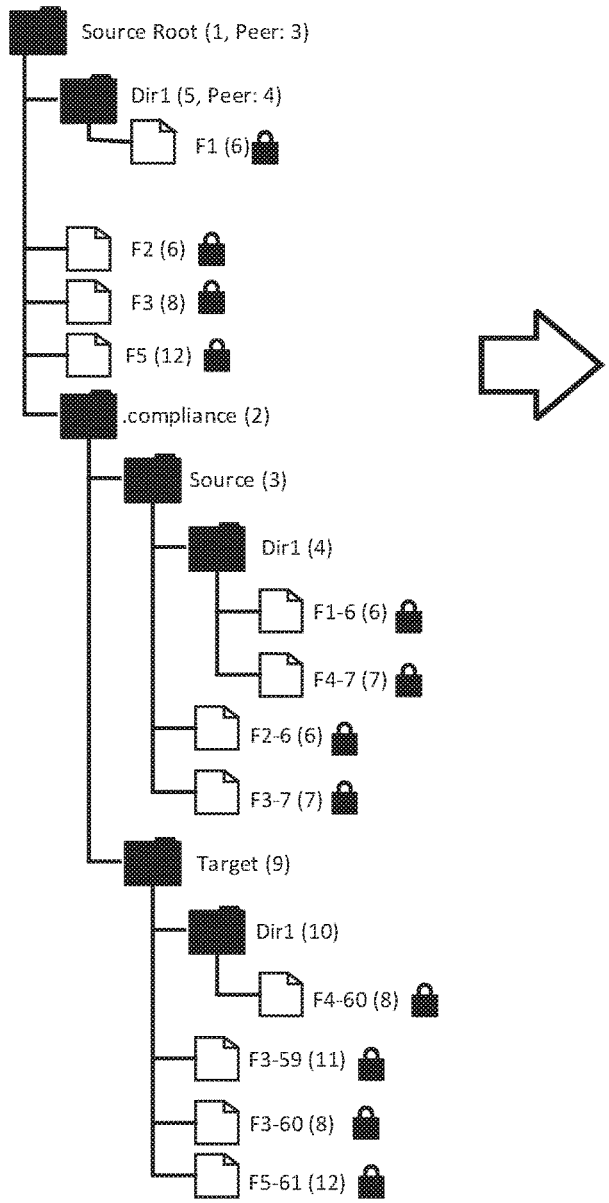
FIG. 30 illustrates a source cluster and a target cluster after the source cluster completes the incremental sync to the target cluster in accordance with implementations of this disclosure.
Figure 30:
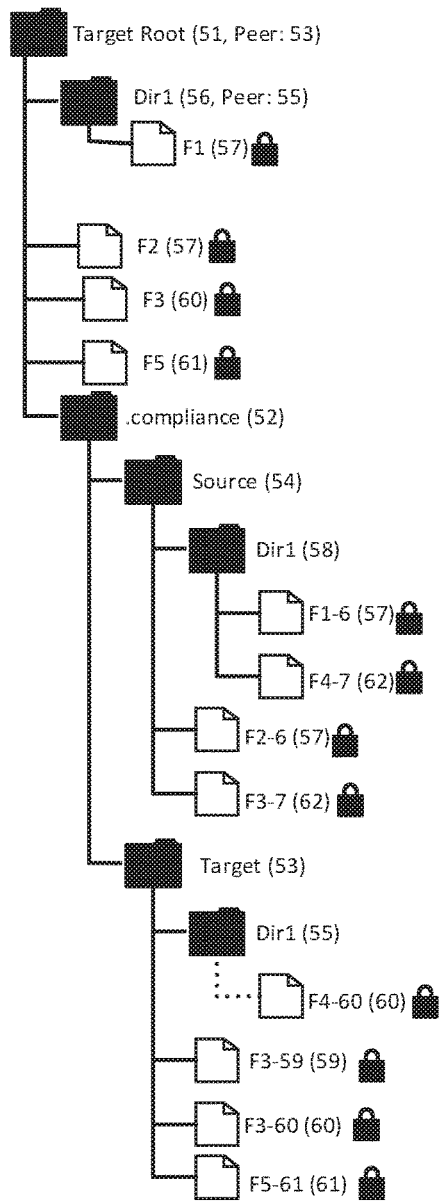

Referring now to FIG. 30 there is illustrated a source cluster and a target cluster after the source cluster completes the incremental sync to the target cluster in accordance with implementations of this disclosure. The late stage commit associated with target LIN 62 is processed and F4-7 and F3-7 now have canonical link in the target resident source compliance store. The incremental sync is now complete, and the target has a new snapshot identifier of S19' indicating it is synced to source snapshot identifier S19.

Figure 31:
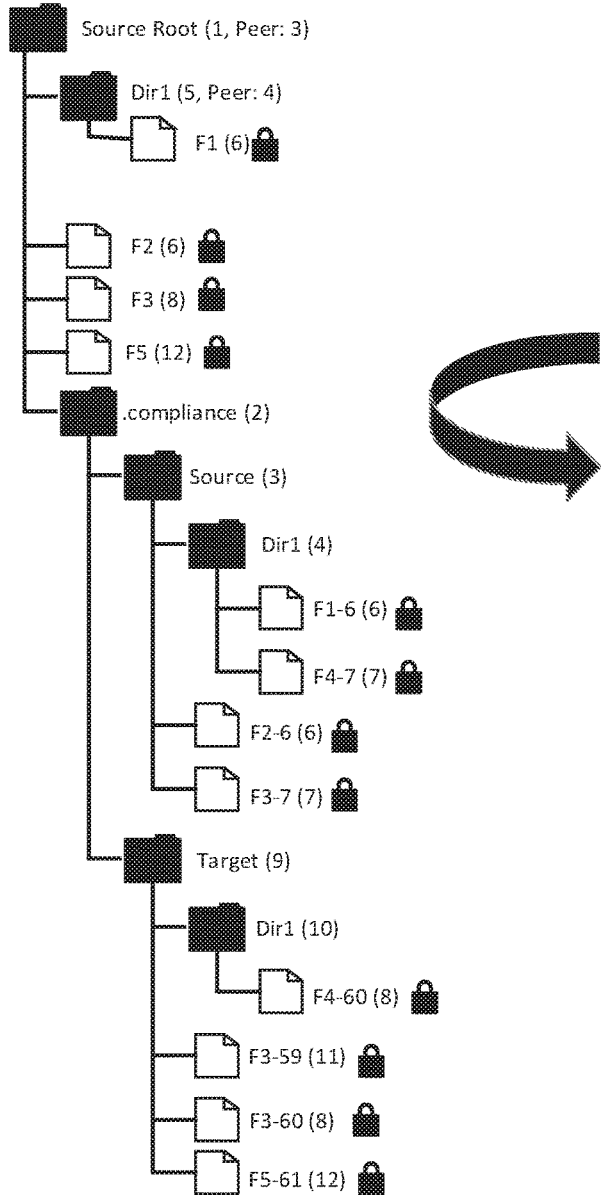
FIG. 31 illustrates a source cluster and a target cluster while the target cluster executes an allow write in accordance with implementations of this disclosure.
Figure 31:
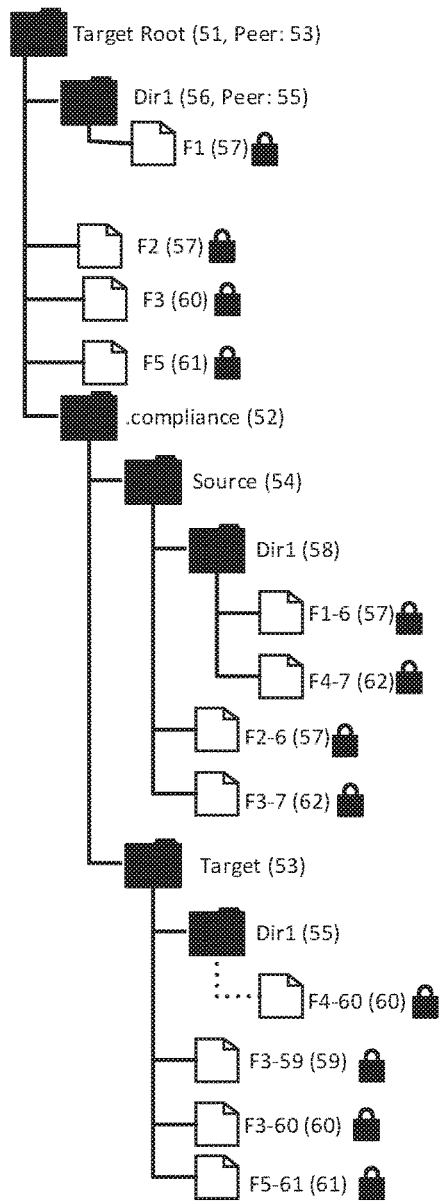

Referring now to FIG. 31 there is illustrated a source cluster and a target cluster while the target cluster executes an allow write in accordance with implementations of this disclosure. The target executes an allow-write operation that will attempt to restore a target dataset to its LKG snapshot and make the dataset writable in preparation for a failover. There are no new files to commit on the source, and new snapshot is taken on the source as S20.

Figure 32:
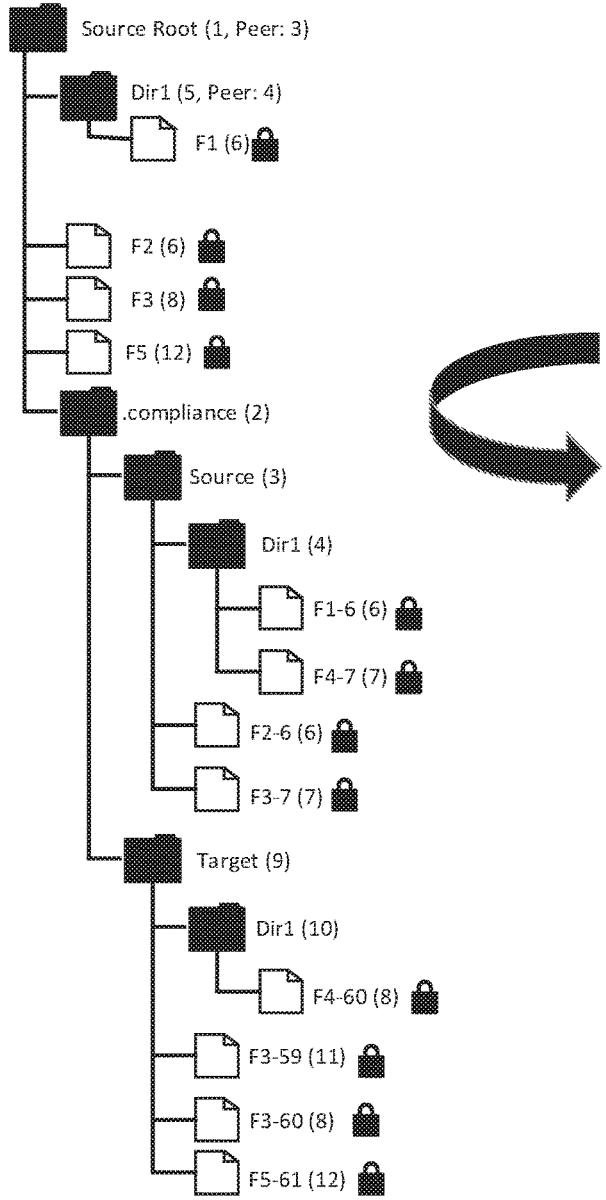
FIG. 32 illustrates a source cluster and a target cluster after the target cluster executes an allow write in accordance with implementations of this disclosure.
Figure 32:
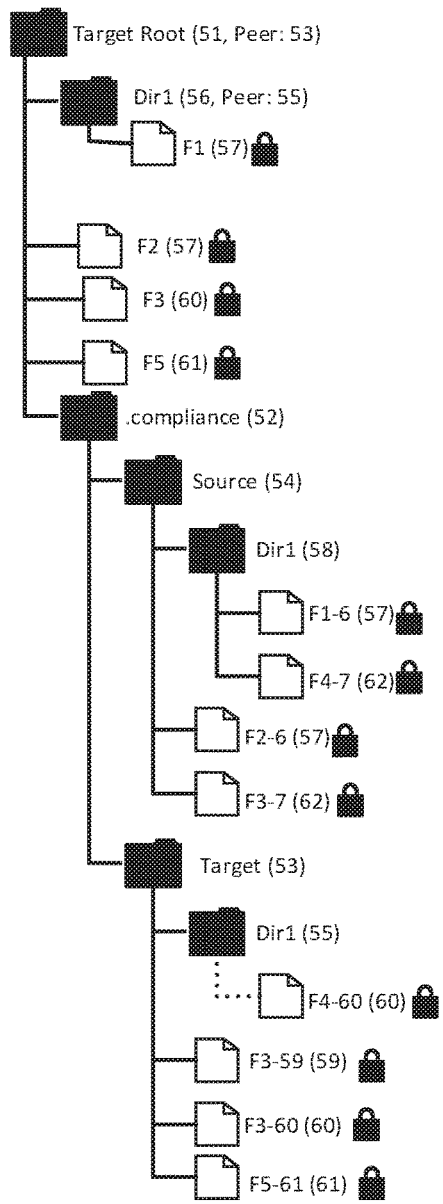

Referring now to FIG. 32 there is illustrated a source cluster and a target cluster after the target cluster executes an allow write in accordance with implementations of this disclosure. With the target having no new file commits to process at FIG. 31, and the target being deemed at a LKG state, the allow write completes on the target. A new snapshot is taken as S21 which is still equivalent to S19'.

Figure 33:
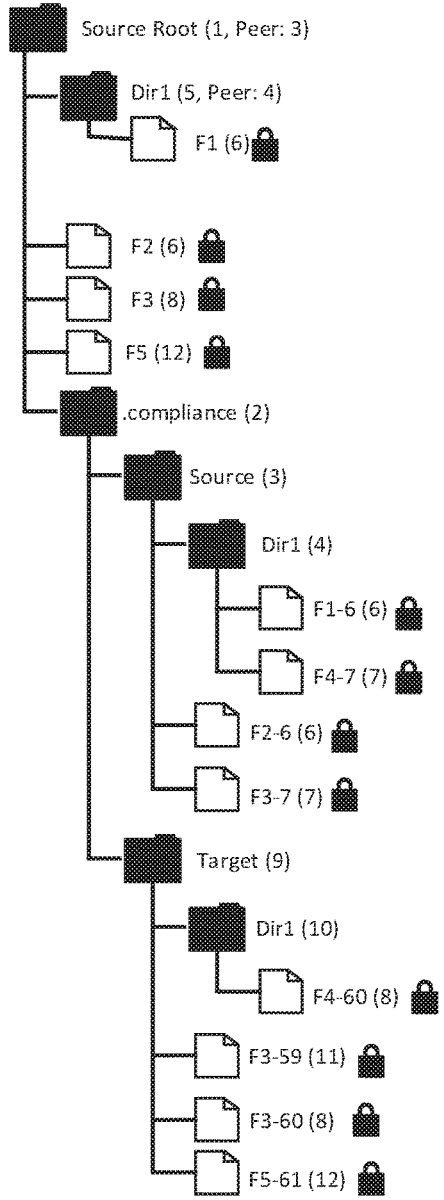
FIG. 33 illustrates a source cluster and a target cluster while the target cluster executes the compliance daemon in accordance with implementations of this disclosure.
Figure 33:
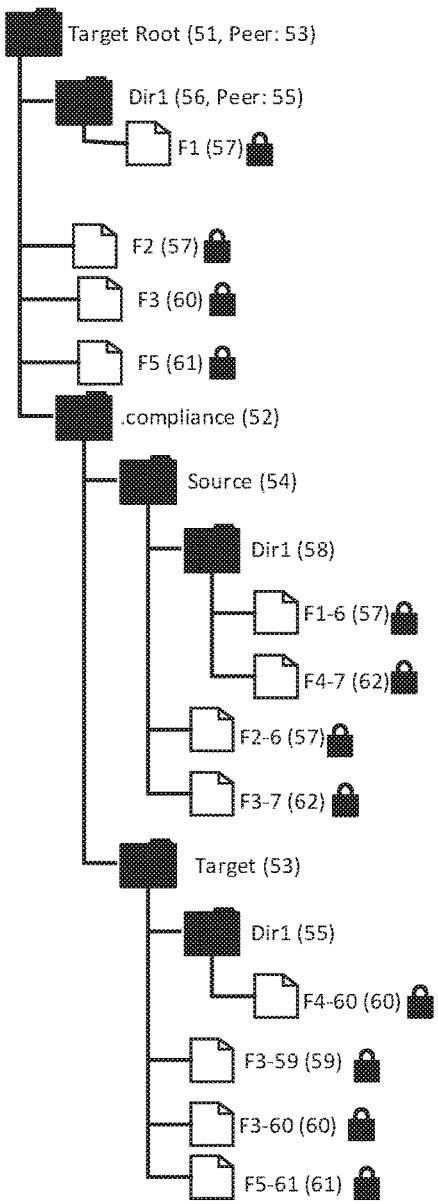

Referring now to FIG. 33 there is illustrated a source cluster and a target cluster while the target cluster executes the compliance daemon in accordance with implementations of this disclosure. The daemon pending link on the target added as described in relation to FIG. 21 is now processed. The canonical link for F4 is created and hardlinked to LIN 60. The daemon pending links list can be cleared.

Figure 34:
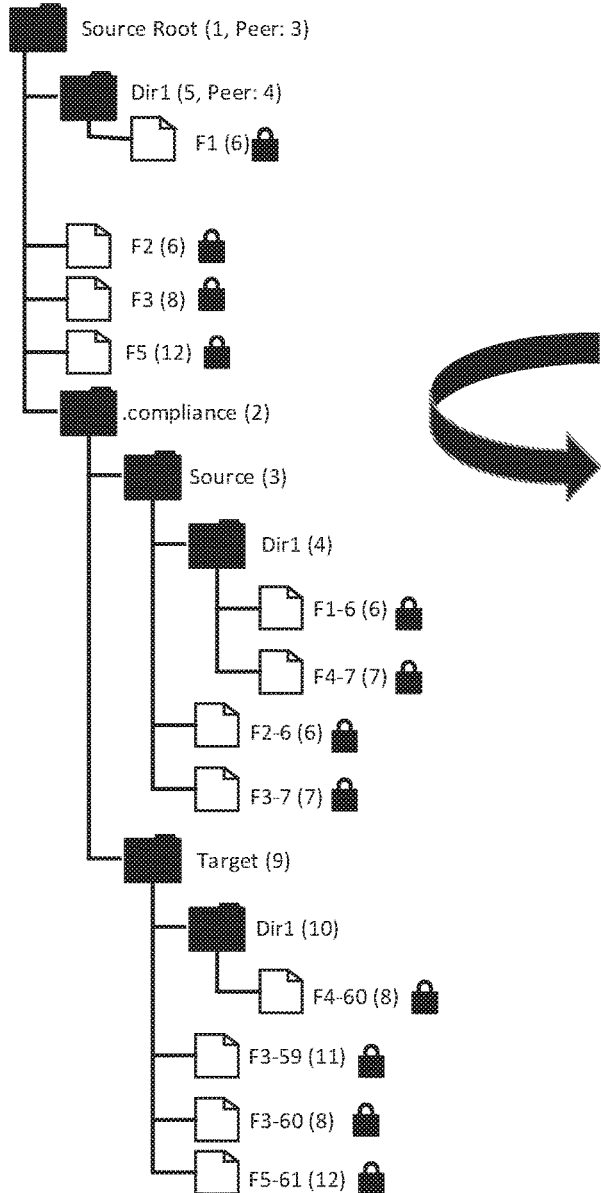
FIG. 34 illustrates a source cluster and a target cluster while the target cluster executes an allow-write revert in accordance with implementations of this disclosure.
Figure 34:
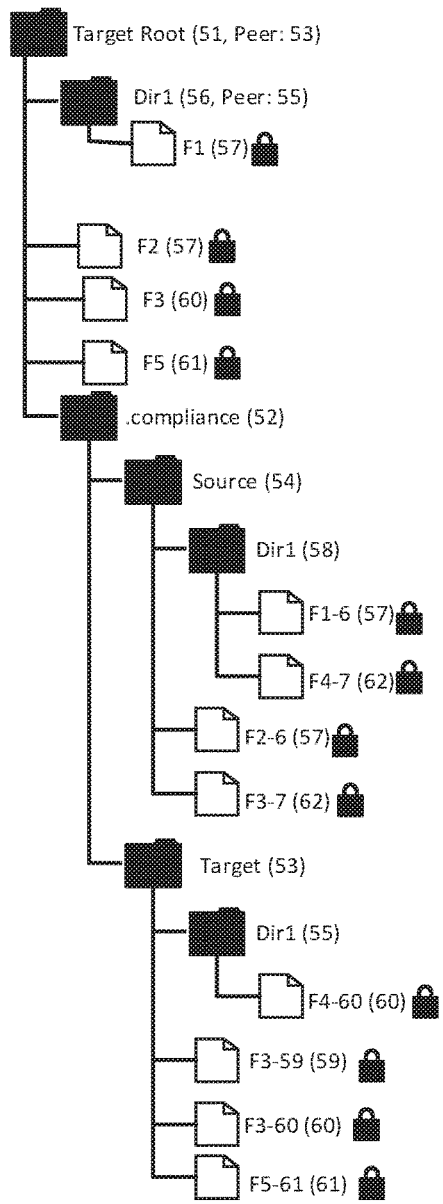

Referring now to FIG. 34 there is illustrated a source cluster and a target cluster while the target cluster executes an allow-write revert in accordance with implementations of this disclosure. The target executes an allow-write revert. A conflict is detected for LIN 60 but is ignored due to it already being in the compliance store. The target has a new snapshot identifier S22.

Figure 35:
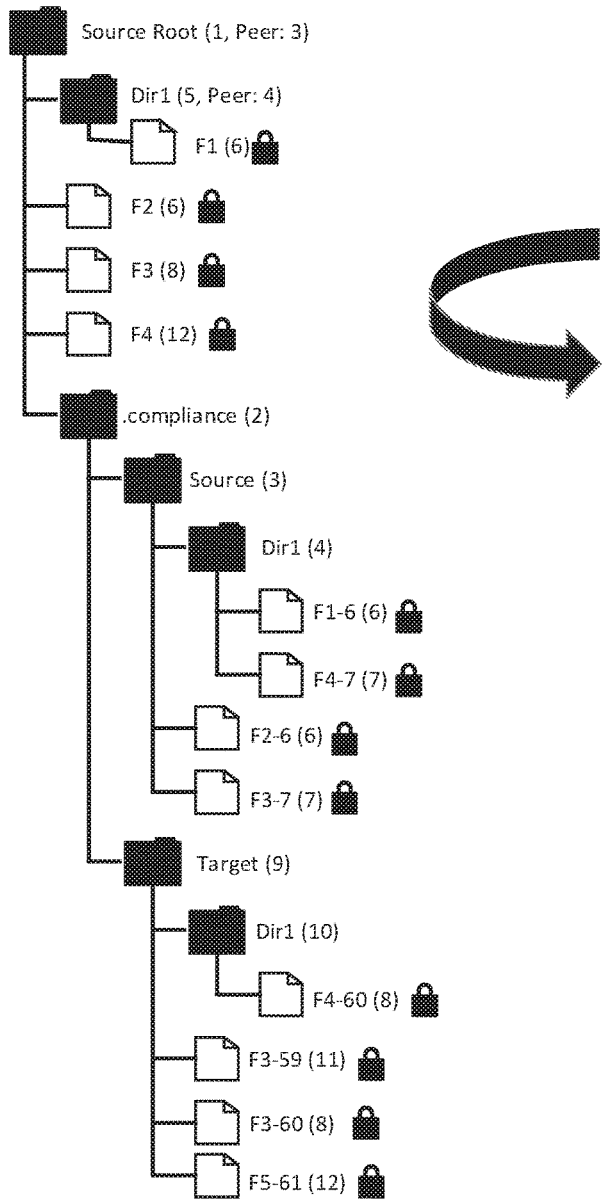
FIG. 35 illustrates a source cluster and a target cluster after the target cluster executed an allow-write revert in accordance with implementations of this disclosure.
Figure 35:
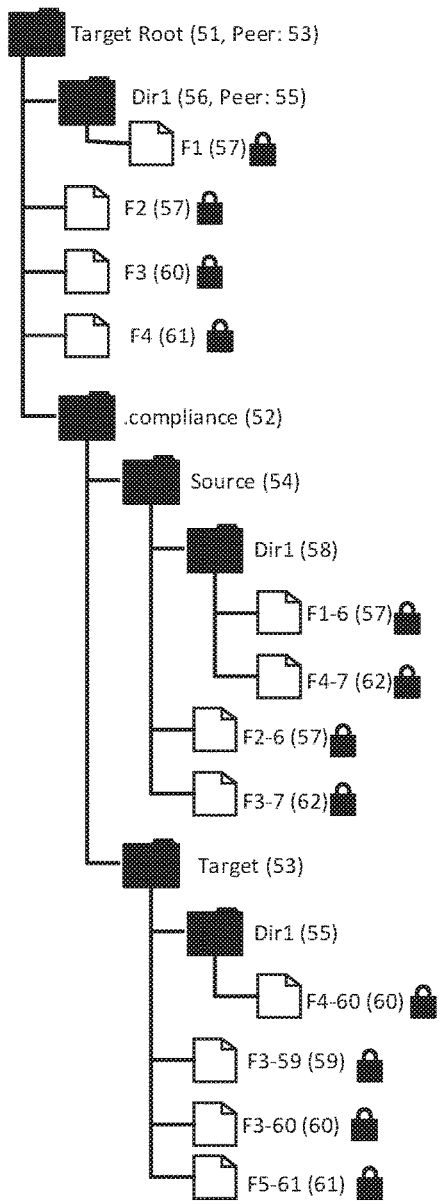

Referring now to FIG. 35 there is illustrated a source cluster and a target cluster after the target cluster executed an allow-write revert in accordance with implementations of this disclosure. The allow-write revert continues processing by determining that the target is already at LKG state. The allow-write revert operation completes, and target snapshot S22 is deemed to be equivalent to S19'.

Figure 36:
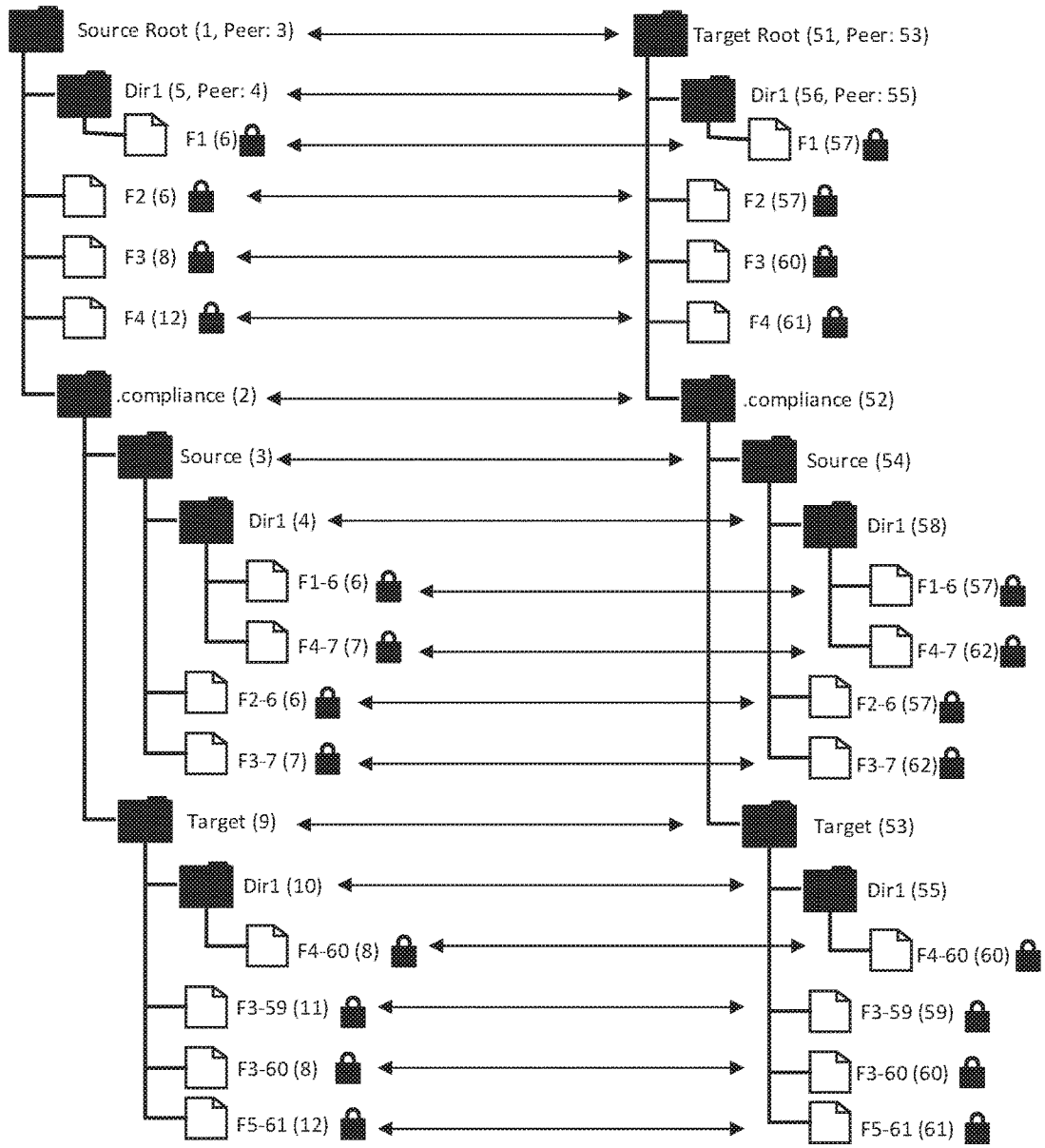
FIG. 36 illustrates a final mapping between a source cluster and a target cluster after a series of incremental syncs, allow-writes, resync preps, and other failover and fail back operations in accordance with implementations of this disclosure.

Referring now to FIG. 36 there is illustrated a final mapping between a source cluster and a target cluster after a series of incremental syncs, allow-writes, resync preps, and other failover and fail back operations in accordance with implementations of this disclosure. As depicted, each file and directory in the source root including the source compliance store and the source resident target compliance store maps directly to each file and directory in the target root including the target resident source compliance store and the target compliance store.

Figure 37:
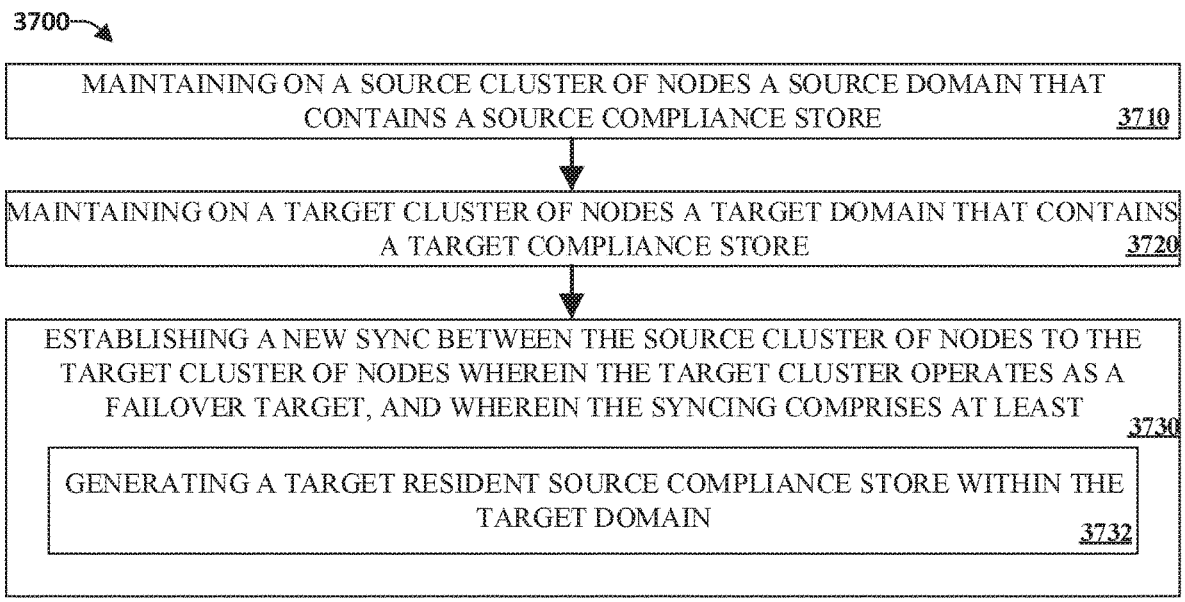
FIG. 37 illustrates an example flow diagram method for establishing compliance stores on a source cluster and a target cluster in conjunction with establishing a new sync in accordance with implementations of this disclosure.
Figure 38:
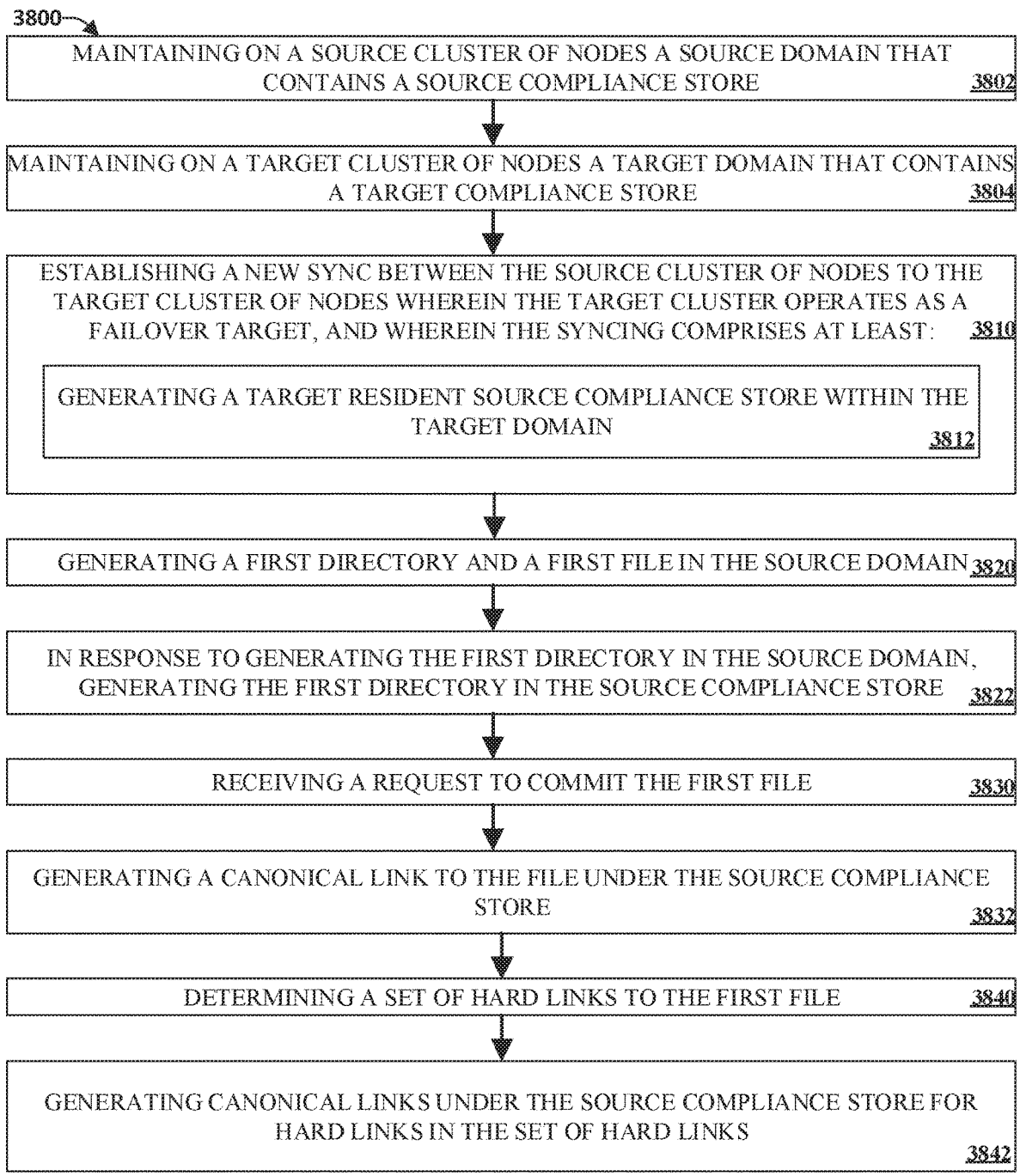
FIG. 38 illustrates an example flow diagram method for generating files and directories in a compliance store environment including committing files in accordance with implementations of this disclosure.
Figure 39:
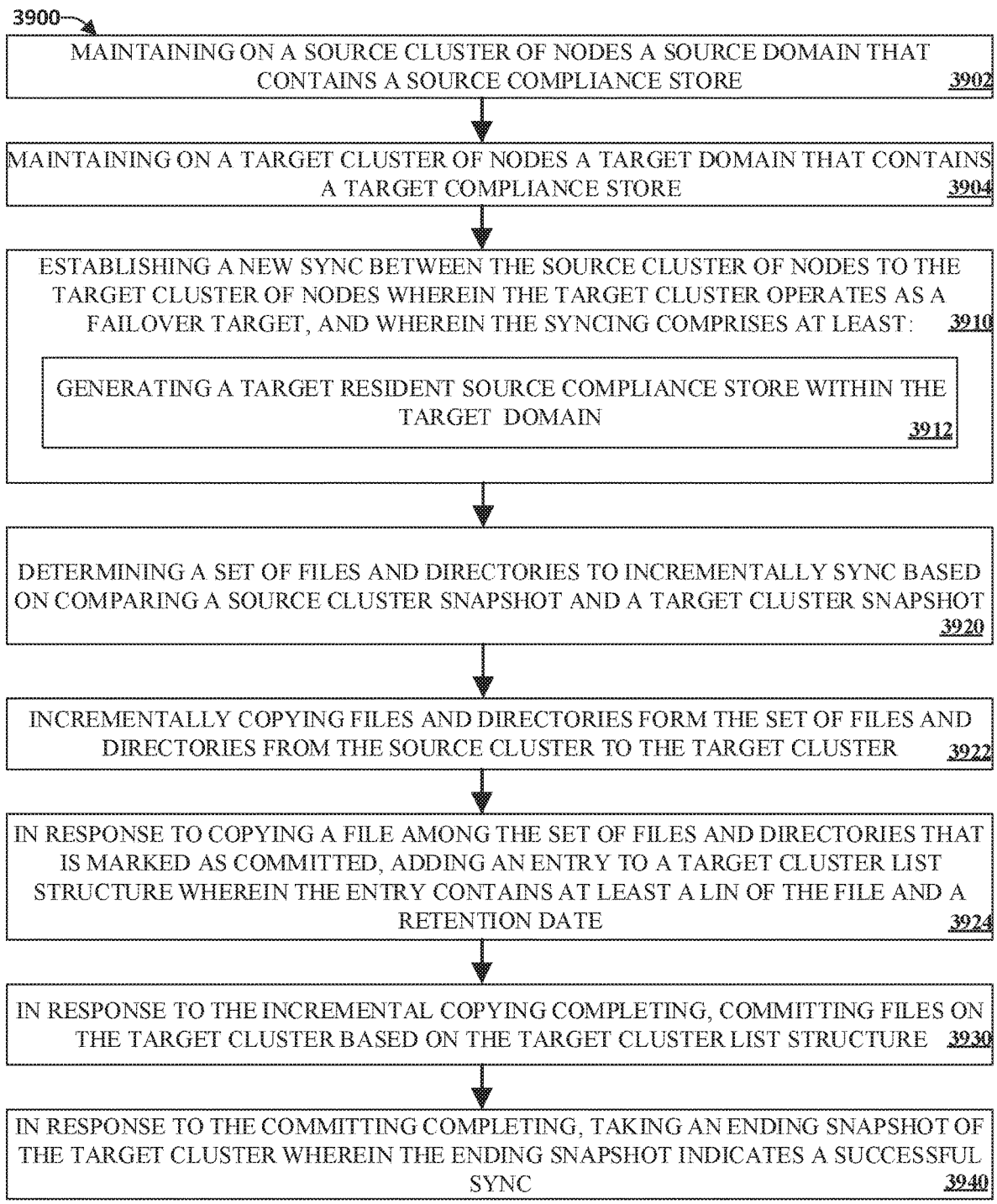
FIG. 39 illustrates an example flow diagram method for incremental syncs of committed files in accordance with implementations of this disclosure.

FIGS. 37-39 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 37 illustrates an example flow diagram method for establishing compliance stores on a source cluster and a target cluster in conjunction with establishing a new sync in accordance with implementations of this disclosure. At 3710, a source cluster of nodes can maintain a source domain that contains a source compliance store. At 3720, a target cluster of nodes can maintain a target domain that contains a target compliance store.

At 3730, a new sync can be established between the source cluster of nodes to the target cluster of nodes wherein the target cluster operates as a failover target, and wherein the syncing comprises at least steps 3732. At 3732, a target resident source compliance store can be generated within the target domain. In one implementation, a target logical inode ("LIN") map that maps a set of source LINs to a set of target LINs can be generated as a part of establishing the new sync.

FIG. 38 illustrates an example flow diagram method for generating files and directories in a compliance store environment including committing files in accordance with implementations of this disclosure. At 3802, a source cluster of nodes can maintain a source domain that contains a source compliance store. At 3804, a target cluster of nodes can maintain a target domain that contains a target compliance store.

At 3810, a new sync can be established between the source cluster of nodes to the target cluster of nodes wherein the target cluster operates as a failover target, and wherein the syncing comprises at least steps 3812. At 3812, a target resident source compliance store can be generated within the target domain.

At 3820, a first directory and a first file can be generated in the source domain. At 3822, in response to generating the first directory in the source domain, the first directory can be generated in the source compliance store.

At 3830, a request to commit the first file can be received. At 3832, a canonical link can be generated to the file under the source compliance store. It can be appreciated that canonical links are non-erasable and non-modifiable over the entire life of a set retention period.

At 3840, a first set of hard links to the first file can be determined. At 3842, canonical links under the source compliance store can be generated for hard links in the set of hard links. It can be appreciated that this can occur asynchronously from step 3832 in accordance with implementations of this disclosure.

FIG. 39 illustrates an example flow diagram method for incremental syncs of committed files in accordance with implementations of this disclosure. At 3902, a source cluster of nodes can maintain a source domain that contains a source compliance store. At 3904, a target cluster of nodes can maintain a target domain that contains a target compliance store.

At 3910, a new sync can be established between the source cluster of nodes to the target cluster of nodes wherein the target cluster operates as a failover target, and wherein the syncing comprises at least step 3912. At 3912, a target resident source compliance store can be generated within the target domain.

At 3920, a set of files and directories to incrementally sync can be determined based on comparing a source cluster snapshot and a target cluster snapshot. At step 3922, files and directories determined at step 3920 can be incrementally copied from the source cluster of nodes to the target cluster of nodes. At 3924, in response to copying a file among the set of files and directories that is marked as committed, adding an entry to a target cluster list structure wherein the entry contains at least a LIN of the file and a retention date. In one implementation, the list structure is a system b-tree.

At 3930, in response to incremental copying completing, files can be committed on the target cluster based on the target cluster list structure.

At 3940, in response to the committing occurring at step 3930 completing, an ending snapshot of the target cluster of nodes can be taken wherein the ending snapshot indicates a successful sync.

Figure 40:
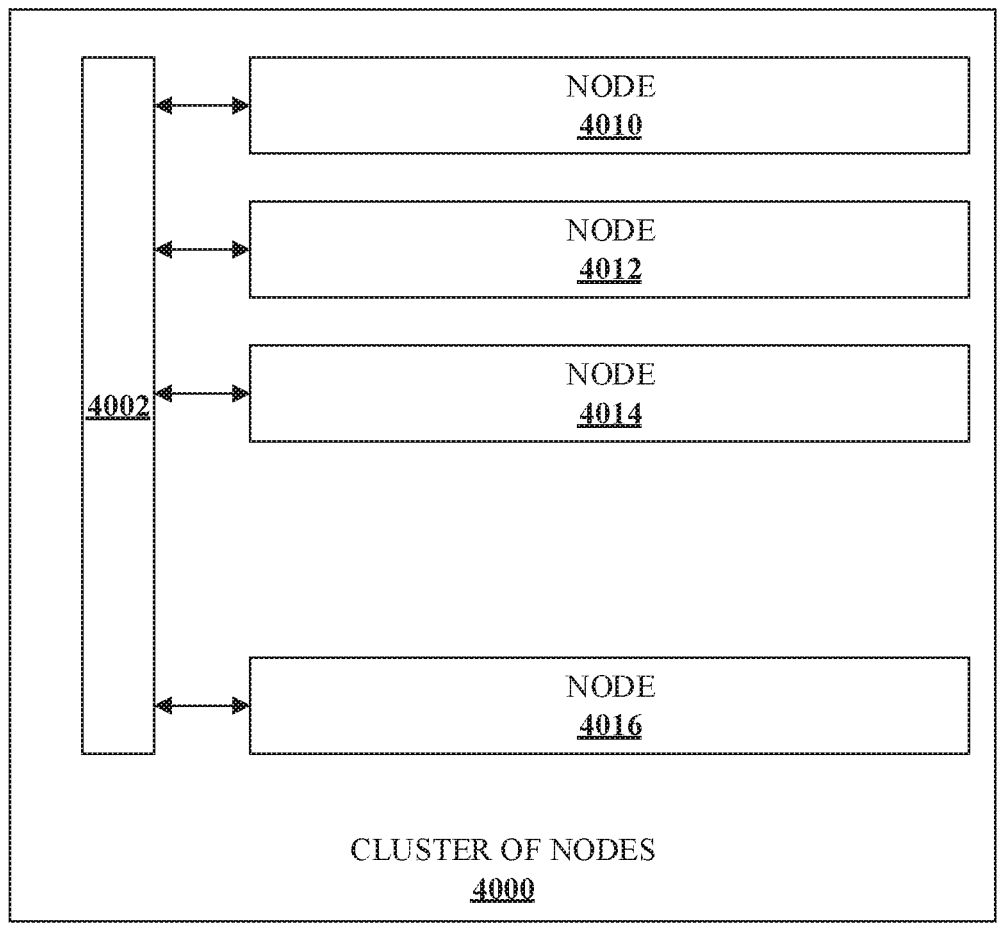
FIG. 40 illustrates an example block diagram of a cluster of nodes in accordance with implementations of this disclosure.

FIG. 40 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 4010, 4012, 4014 and 4016 operating in a cluster; however, it can be appreciated that more or less nodes can make up a cluster. It can be further appreciated that nodes among the cluster of nodes do not have to be in a same enclosure as shown for ease of explanation in FIG. 40, and can be geographically disparate. Backplane 4002 can be any type of commercially available networking infrastructure that allows nodes among the cluster of nodes to communicate amongst each other in as close to real time as the networking infrastructure allows. It can be appreciated that the backplane 4002 can also have a separate power supply, logic, I/O, etc. as necessary to support communication amongst nodes of the cluster of nodes.

As shown in the figure, enclosure 4000 contains at least a power supply 4004, an input/output interface 4006, rack logic 4008, several nodes 4010, 4012, 4014, and 4016, and backplane 4002. Power supply 4004 provides power to each component and node within the enclosure. The input/output interface 4006 provides internal and external communication for components and nodes within the enclosure. Backplane 4008 can enable passive and active communication of power, logic, input signals, and output signals for each node.

It can be appreciated that the Cluster of nodes 4000 can be in communication with a second Cluster of Nodes as described in the subject disclosure and work in conjunction to provide at least the implementations as disclosed herein. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 41:
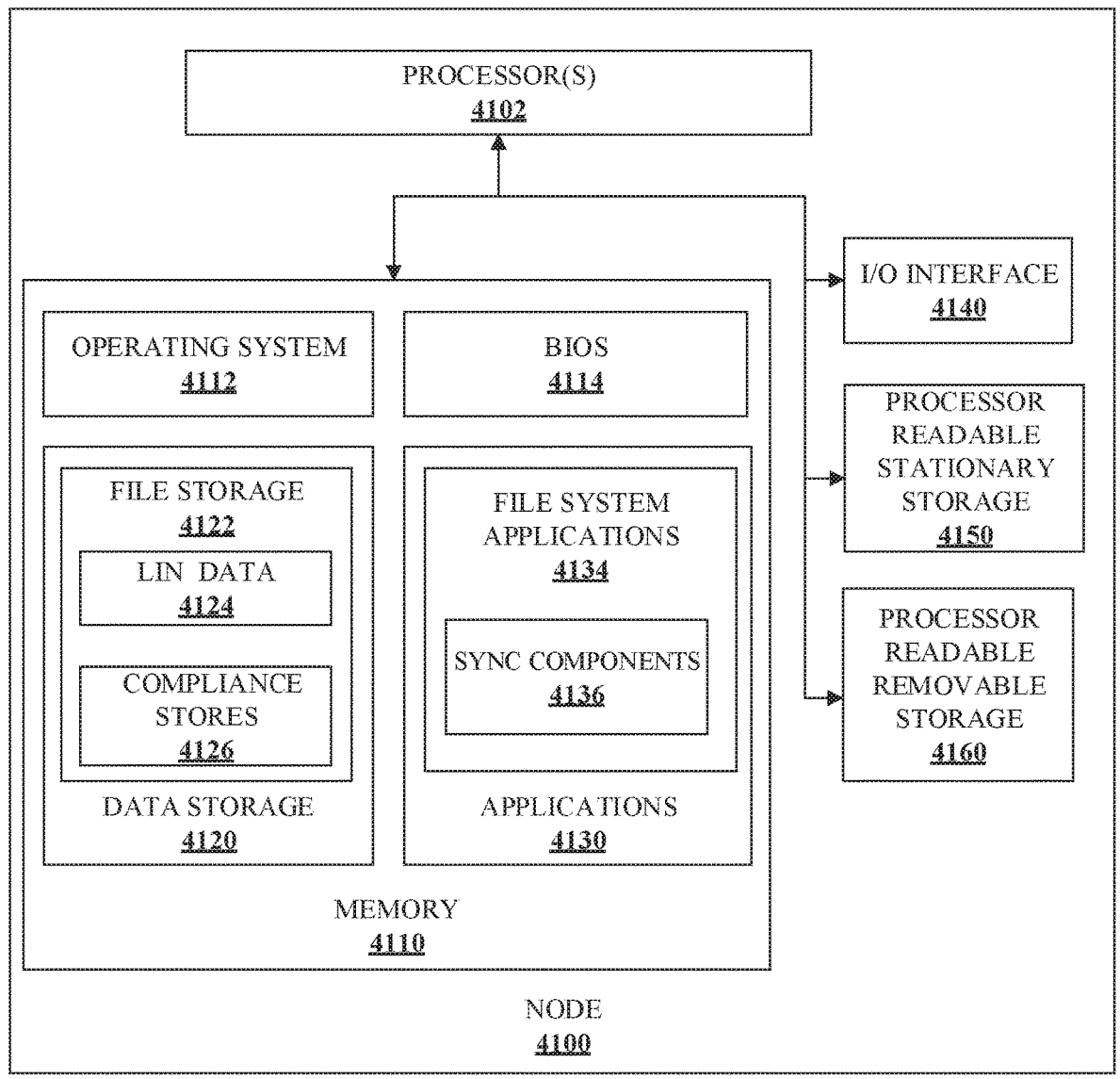
FIG. 41 illustrates an example block diagram of a node in accordance with implementations of this disclosure.

FIG. 41 illustrates an example block diagram of a node 4100 in accordance with implementations of this disclosure. As shown in FIG. 40, a plurality of nodes may be included in one enclosure that shares resources provided by the enclosure to reduce size, power, and cost.

Node 4100 includes processor 4102 which communicates with memory 4110 via a bus. Node 4100 also includes input/output interface 4140, processor-readable stationary storage device(s) 4150, and processor-readable removable storage device(s) 4160. Input/output interface 4140 can enable node 4100 to communicate with other nodes, mobile devices, network devices, and the like. Processor-readable stationary storage device 4150 may include one or more devices such as an electromagnetic storage device (hard disk), solid state hard disk (SSD), hybrid of both an SSD and a hard disk, and the like. In some configurations, a node may include many storage devices. Also, processor-readable removable storage device 4160 enables processor 4102 to read non-transitive storage media for storing and accessing processor-readable instructions, modules, data structures, and other forms of data. The non-transitive storage media may include Flash drives, tape media, floppy media, disc media, and the like.

Memory 4110 may include Random Access Memory (RAM), Read-Only Memory (ROM), hybrid of RAM and ROM, and the like. As shown, memory 4110 includes operating system 4112 and basic input/output system (BIOS) 4114 for enabling the operation of node 4100. In various embodiments, a general-purpose operating system may be employed such as a version of UNIX, LINUX™, a specialized server operating system such as Microsoft's Windows Server™ and Apple Computer's OS X, or the like.

Applications 4130 may include processor executable instructions which, when executed by node 4100, transmit, receive, and/or otherwise process messages, audio, video, and enable communication with other networked computing devices. Examples of application programs include database servers, file servers, calendars, transcoders, and so forth. Applications 4130 may include, for example, file system application 4134, and sync applications 4136 according to implementations of this disclosure. For example, an application to sync a source cluster and a target cluster can be used by a user or administrator to establish a new sync, request a failover, request a failback, associate a snapshot set or subset for syncing, managing sync policies, etc. It can be appreciated that a UI for such application can exists, such as within a web UI for the distributed file system as a whole.

Human interface components (not pictured), may be remotely associated with node 4100, which can enable remote input to and/or output from node 4100. For example, information to a display or from a keyboard can be routed through the input/output interface 4140 to appropriate peripheral human interface components that are remotely located. Examples of peripheral human interface components include, but are not limited to, an audio interface, a display, keypad, pointing device, touch interface, and the like.

Data storage 4120 may reside within memory 4110 as well, storing file storage 4122 data such as metadata or LIN data 4124. It can be appreciated that LIN data and/or metadata can relate to rile storage within processor readable stationary storage 4150 and/or processor readable removable storage 4160. For example, LIN data may be cached in memory 4110 for faster or more efficient frequent access versus being stored within processor readable stationary storage 4150. In addition, Data storage 4120 can also host compliance store data 4126 in accordance with implementations of this disclosure.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    maintaining on a source cluster of computing nodes a source domain that includes a source compliance store;
    maintaining on a target cluster of the computing nodes a target domain that includes a target compliance store; and
    establishing a new sync between the source cluster of the computing nodes to the target cluster of the computing nodes wherein the target cluster operates as a failover target, and wherein the syncing comprises at least:
        delaying an application of commits by creating a new target cluster side system b-tree to track which files are to be committed during the new sync;
        sending pending canonical links during the new sync, wherein each pending canonical links reference a write once read many (WORM) file, wherein each canonical link is guaranteed to be non-erasable and non-rewritable for the duration of its retention period; and
        generating a target resident source compliance store within the target domain.

2. The method of claim 1, further comprising:
    generating a first directory and a first file in the source domain; and
    in response to generating the first directory in the source domain, generating the first directory in the source compliance store.

3. The method of claim 2, further comprising:
    receiving a request to commit the first file; and
    generating a canonical link to the file under the source compliance store.

4. The method of claim 3, further comprising:
    generating canonical links under the source compliance store to hard links in a set of hard links.

5. The method of claim 1, further comprising:
    determining a set of files and directories to incrementally sync based on comparing a source cluster snapshot and a target cluster snapshot;
    incrementally copying files and directories form the set of files and directories from the source cluster of the computing nodes to the target cluster of the computing nodes; and
    in response to copying a file among the set of files and directories that is marked as committed, adding an entry to a target cluster list structure wherein the entry includes at least a logical inode ("LIN") of the file and a retention date.

6. The method of claim 5, further comprising:
    in response to the incremental copying completing, committing files on the target cluster of the computing nodes based on the target cluster list structure.

7. The method of claim 6, further comprising:
    in response to the committing completing, taking an ending snapshot of the target cluster of the computing nodes wherein the ending snapshot indicates a successful sync.

8. A system comprising at least one hardware processor, at least one storage device, and a memory to store instructions executed by the least one hardware processor to:
    maintain on a source cluster of the computing nodes a source domain that includes a source compliance store;
    maintain on a target cluster of the computing nodes a target domain that includes a target compliance store; and; and
    establish a new sync between the source cluster of the computing nodes to the target cluster of the computing nodes wherein the target cluster operates as a failover target, and wherein the syncing comprises at least:
        delay an application of commits by creating a new target cluster side system b-tree to track which files are to be committed during the new sync;
        send pending canonical links during the new sync, wherein each pending canonical links reference a write once read many (WORM) file, wherein each canonical link is guaranteed to be non-erasable and non-rewritable for the duration of its retention period; and
        generate a target resident source compliance store within the target domain.

9. The system of claim 8, further configured to:
    generate a first directory and a first file in the source domain; and in response to generating the first directory in the source domain, generating the first directory in the source compliance store.

10. The system of claim 9, further configured to:
receive a request to commit the first file; and
generate a canonical link to the first file under the source compliance store.

11. The system of claim 10, further configured to:
generate canonical links under the source compliance store to hard links in the set of hard links.

12. The system of claim 8, further configured to:
determine a set of files and directories to incrementally sync based on comparing a source cluster of the computing nodes snapshot and a target cluster of the computing nodes snapshot;
incrementally copy files and directories form the set of files and directories from the source cluster of the computing nodes to the target cluster of the computing nodes;
in response to copying a file among the set of files and directories that is marked as committed, add an entry to a target cluster list structure wherein the entry includes at least a logical inode ("LIN") of the file and a retention date.

13. The system of claim 12, further configured to:
in response to the incremental copying completing, commit files on the target cluster of the computing nodes based on the target cluster list structure.

14. The system of claim 13, further configured to:
in response to the committing completing, take an ending snapshot of the target cluster of the computing nodes wherein the ending snapshot indicates a successful sync.

15. A non-transitory computer readable medium with program instructions stored thereon to perform the following acts:
maintaining on a source cluster of the computing nodes a source domain that includes a source compliance store;
maintaining on a target cluster of the computing nodes a target domain that includes a target compliance store; and
establishing a new sync between the source cluster of the computing nodes to the target cluster of the computing nodes wherein the target cluster operates as a failover target, and wherein the syncing comprises at least:
delaying an application of commits by creating a new target cluster side system b-tree to track which files are to be committed during the new sync;
sending pending canonical links during the new sync, wherein each pending canonical links reference a write once read many (WORM) file, wherein each canonical link is guaranteed to be non-erasable and non-rewritable for the duration of its retention period; and
generating a target resident source compliance store within the target domain.

16. The non-transitory computer readable medium of claim 15, with program instructions stored thereon to further perform the following acts:
generating a first directory and a first file in the source domain; and
in response to generating the first directory in the source domain, generating the first directory in the source compliance store.

17. The non-transitory computer readable medium of claim 16, with program instructions stored thereon to further perform the following acts:
receiving a request to commit the first file; and
generating a canonical link to the file under the source compliance store.

18. The non-transitory computer readable medium of claim 17, with program instructions stored thereon to further perform the following acts:
generating canonical links under the source compliance store to hard links in the set of hard links.

19. The non-transitory computer readable medium of claim 15, with program instructions stored thereon to further perform the following acts:
determining a set of files and directories to incrementally sync based on comparing a source cluster of the computing nodes snapshot and a target cluster of the computing nodes snapshot;
incrementally copying files and directories form the set of files and directories from the source cluster of the computing nodes to the target cluster of the computing nodes;
in response to copying a file among the set of files and directories that is marked as committed, adding an entry to a target cluster list structure wherein the entry includes at least a logical inode ("LIN") of the file and a retention date.

20. The non-transitory computer readable medium of claim 19, with program instructions stored thereon to further perform the following acts:
in response to the incremental copying completing, committing files on the target cluster of the computing nodes based on the target cluster list structure; and
in response to the committing completing, taking an ending snapshot of the target cluster of the computing nodes wherein the ending snapshot indicates a successful sync.

* * * * *